(12) United States Patent
Fosgard et al.

(10) Patent No.: US 12,277,523 B2
(45) Date of Patent: Apr. 15, 2025

(54) MATERIALS DELIVERY CONTAINER WITH BATTERY SYSTEM THEREIN

(71) Applicant: Tulips Corporation, Milwaukie, OR (US)

(72) Inventors: Eric Fosgard, Milwaukie, OR (US); Jack C. Cornelius, Tigard, OR (US)

(73) Assignee: Tulips Corporation

( * ) Notice: Subject to any disclaimer, the term of this patent is extended or adjusted under 35 U.S.C. 154(b) by 0 days.

(21) Appl. No.: 18/699,265

(22) PCT Filed: Oct. 13, 2021

(86) PCT No.: PCT/US2021/054847
§ 371 (c)(1),
(2) Date: Apr. 5, 2024

(87) PCT Pub. No.: WO2023/063946
PCT Pub. Date: Apr. 20, 2023

(65) Prior Publication Data
US 2024/0412150 A1  Dec. 12, 2024

(51) Int. Cl.
| | |
|---|---|
| *G06Q 10/083* | (2024.01) |
| *B62M 6/40* | (2010.01) |
| *G07C 5/02* | (2006.01) |
| *H01M 10/46* | (2006.01) |
| *H01M 50/249* | (2021.01) |
| *H02J 7/00* | (2006.01) |

(52) U.S. Cl.
CPC ............. *G06Q 10/083* (2013.01); *B62M 6/40* (2013.01); *G07C 5/02* (2013.01); *H01M 10/46* (2013.01); *H01M 50/249* (2021.01); *H01M 2220/20* (2013.01); *H02J 7/0013* (2013.01)

(58) Field of Classification Search
CPC .. G06Q 10/083; H01M 50/249; H01M 10/46; B62M 6/40; G07C 5/02
USPC ......................................................... 701/83
See application file for complete search history.

(56) References Cited

U.S. PATENT DOCUMENTS

| | | |
|---|---|---|
| 2011/0114398 A1 | 5/2011 | Bianco |
| 2019/0164113 A1 | 5/2019 | Fosgard |
| 2019/0291560 A1 | 9/2019 | Lampsa |
| 2021/0026378 A1 | 1/2021 | Ruth et al. |
| 2023/0182613 A1 | 6/2023 | Jung |

*Primary Examiner* — Daniel A Hess
(74) *Attorney, Agent, or Firm* — Howard Russell

(57) ABSTRACT

Combined container and battery system, materials delivery vehicle, and battery system charging system, adapted for charging a container battery system within rated specifications for accomplishing materials delivery of container contents depending on a determined power budget determined relative to such parameters as chosen vehicle weight, whether e-cargo delivery bike or autonomous delivery vehicle, chosen vehicle efficiency, battery system capacity, an allowed driver weight and driver efficiency for e-cargo bike deliveries, materials information, materials weight, number of stops, distance between each stop, recipient information, recipient address, and route topology, wherein excess power is indicated as available for auxiliary tasks.

14 Claims, 19 Drawing Sheets

| | | | | Distance<br>km | Elevation<br>ft | Slope<br>% |
|---|---|---|---|---|---|---|
| LMTS | 14300 SW Barrows Rd | Tigard | OR | 97223 | 0 | 230 | |
| 1 | 14115 SW Chehalem Ct. | Tigard | OR | 97223 | 0.3218 | 223 | 1.0 |
| 2 | 12254 SW Westbury Terrace | Tigard | OR | 97223 | 0.6436 | 243 | 1.1 |
| 3 | 13370 SW Scotts Bridge Dr | Tigard | OR | 97223 | 0.8045 | 233 | 1.0 |
| 4 | 11900 SW Morning Hill Dr | Tigard | OR | 97223 | 0.4827 | 233 | 1.0 |
| 5 | 11735 SW Swendon Loop | Tigard | OR | 97223 | 0.4827 | 220 | 0.9 |
| 6 | 11579 SW 135th Ave | Tigard | OR | 97223 | 0.4827 | 220 | 1.0 |
| 7 | 13873 SW Ashbury Ln | Tigard | OR | 97223 | 0.6436 | 184 | 0.8 |
| 8 | 14124 SW Springbrook Ln | Tigard | OR | 97223 | 0.3218 | 207 | 1.1 |
| 9 | 11723 SW Murre Terrace | Beaverton | OR | 97007 | 0.1609 | 197 | 1.0 |
| 10 | 14198 SW Barrows Rd | Tigard | OR | 97223 | 0.4827 | 226 | 1.1 |
| LMTS | 14300 SW Barrows Rd | Tigard | OR | 97223 | 0.3218 | 236 | 1.0 |
| | | | | 5.1488 | | |

Figure 9A

| | Time (mins) | off vehicle mins | Package ID unique # | Weight (kg) kg | Weight to Next kg | Power rate W/hr | Power Used Watts | Remaining Ah | SOC % |
|---|---|---|---|---|---|---|---|---|---|
| LMTS | | | LMTS | | 74.90 | 38 | | 396.00 | |
| 1 | 3 | 3 | 1001 | 10.70 | 64.20 | 37 | 11.91 | 384.09 | 96.99% |
| 2 | 3 | 3 | 1002 | 3.50 | 60.70 | 36 | 23.17 | 360.92 | 91.14% |
| 3 | 3 | 3 | 1003 | 6.20 | 54.50 | 34 | 27.35 | 333.57 | 84.24% |
| 4 | 1 | 3 | 1004 | 0.50 | 54.00 | 34 | 16.41 | 317.16 | 80.09% |
| 5 | 2 | 3 | 1005 | 22.70 | 31.30 | 31 | 14.96 | 302.20 | 76.31% |
| 6 | 2 | 3 | 1006 | 14.50 | 16.80 | 29 | 14.00 | 288.20 | 72.78% |
| 7 | 3 | 3 | 1007 | 3.40 | 13.40 | 28 | 18.02 | 270.18 | 68.23% |
| 8 | 1 | 3 | 1008 | 7.20 | 6.20 | 27 | 8.69 | 261.49 | 66.03% |
| 9 | 1 | 3 | 1009 | 1.40 | 4.80 | 27 | 4.34 | 257.14 | 64.94% |
| 10 | 3 | 3 | 1010 | 4.80 | 0.00 | 27 | 13.03 | 244.11 | 61.64% |
| LMTS | 2 | 3 | LMTS | | | | | | |
| | 24 | 33 | | 74.9 | | | 151.89 | | |

Figure 9B

| | | | | | Distance | Elevation | Slope |
|---|---|---|---|---|---|---|---|
| | | | | | km | ft | % |
| LMTS | 14300 SW Barrows Rd | Tigard | OR | 97223 | 0 | 230 | |
| 1 | 14115 SW Chehalem Ct. | Tigard | OR | 97223 | 0.3218 | 223 | 1.0 |
| 2 | 12254 SW Westbury Terrace | Tigard | OR | 97223 | 0.6436 | 243 | 1.1 |
| 3 | 13370 SW Scotts Bridge Dr | Tigard | OR | 97223 | 0.8045 | 233 | 1.0 |
| 4 | 11900 SW Morning Hill Dr | Tigard | OR | 97223 | 0.4827 | 233 | 1.0 |
| 5 | 11735 SW Swendon Loop | Tigard | OR | 97223 | 0.4827 | 220 | 0.9 |
| 6 | 11579 SW 135th Ave | Tigard | OR | 97223 | 0.4827 | 220 | 1.0 |
| 7 | 13873 SW Ashbury Ln | Tigard | OR | 97223 | 0.6436 | 184 | 0.8 |
| 8 | 14124 SW Springbrook Ln | Tigard | OR | 97223 | 0.3218 | 207 | 1.1 |
| 9 | 11723 SW Murre Terrace | Beaverton | OR | 97007 | 0.1609 | 197 | 1.0 |
| 10 | 14198 SW Barrows Rd | Tigard | OR | 97223 | 0.4827 | 226 | 1.1 |
| LMTS | 14300 SW Barrows Rd | Tigard | OR | 97223 | 0.3218 | 236 | 1.0 |
| | | | | | 5.1488 | | |

Figure 10A

| | Time (mins) | off vehicle mins | Package ID unique # | Weight (kg) kg | Weight to Next kg | Power rate W/hr | Power Used Watts | Remaining Ah | SOC % |
|---|---|---|---|---|---|---|---|---|---|
| LMTS | | | LMTS | | 350.00 | 74 | | 396.00 | |
| 1 | 3 | 3 | 1001 | 10.70 | 339.30 | 73 | 23.49 | 372.51 | 94.07% |
| 2 | 3 | 3 | 1002 | 3.50 | 335.80 | 86 | 55.35 | 317.16 | 80.09% |
| 3 | 3 | 3 | 1003 | 6.20 | 329.60 | 72 | 57.92 | 259.24 | 65.46% |
| 4 | 1 | 3 | 1004 | 0.50 | 329.10 | 71 | 34.27 | 224.96 | 56.81% |
| 5 | 2 | 3 | 1005 | 22.70 | 306.40 | 68 | 32.82 | 192.14 | 48.52% |
| 6 | 2 | 3 | 1006 | 14.50 | 291.90 | 66 | 31.86 | 160.28 | 40.48% |
| 7 | 3 | 3 | 1007 | 3.40 | 288.50 | 66 | 42.48 | 117.80 | 29.75% |
| 8 | 1 | 3 | 1008 | 7.20 | 281.30 | 77 | 24.78 | 93.03 | 23.49% |
| 9 | 1 | 3 | 1009 | 1.40 | 279.90 | 65 | 10.46 | 82.57 | 20.85% |
| 10 | 3 | 3 | 1010 | 4.80 | 275.10 | 76 | 36.69 | 45.88 | 11.59% |
| LMTS | 2 | 3 | LMTS | 0.00 | 275.10 | 76 | 24.46 | 21.42 | 5.41% |
| | 24 | 33 | | 74.9 | | | 374.58 | | |

Figure 10B

MATERIALS DELIVERY CONTAINER WITH BATTERY SYSTEM THEREIN

The present application is an originally-filed PCT patent application, and it claims no priority to, or benefit of, any other application.

TECHNICAL FIELD

The present invention relates to materials delivery containers for use with last-mile delivery vehicles, such as e-cargo bikes and/or autonomous delivery vehicles (AVs) and means of powering such vehicles, whether such a container is of a type which defines a single optionally-lockable and accessible space within the container, or whether such container is of a type which defines a plurality of lockable electronically-accessible spaces within the container, and more particularly to powering such e-cargo-bikes and/or autonomous delivery vehicles with batteries.

BACKGROUND ART

Last mile delivery has referred to a situation where materials, such as packages and other products, have been transferred via containers from a local delivery terminal, such as a bus stop as shown in US Published Patent Application Serial No. 2019/01464113 A1, to Fosgard, for SYSTEM AND METHOD FOR INTERMODAL MATERIALS DELIVERY, or at a TULIPS Station as described in PCT Patent Application, Ser. No. PCT/US2021/39641 by Eric Fosgard, both wherein final business or residential destinations for the materials are within about a two-mile radius of the terminal. Such areas of operations for materials delivery have become increasingly congested with packages and deliveries, to the point of being overrun, such that it has been estimated that the number of package deliveries has tripled for example since 2009 in New York City alone, to 1.1 million packages per day in 2017. See, 1.1 *Million Packages a Day: the Internet Brings Chaos to New York Streets*, New York Times, Oct. 28, 2019.

Such package delivery overwhelm is contributing to excessive traffic, congestion, air, water, and land pollution, and other problems within the city, not to mention the legal hassles associated with it, wherein four package delivery companies in New York City alone, FedEx, FreshDirect, PeaPod, and UPS, accumulated over 515,000 parking summonses in 2018, totaling over $27,000,000 in fines. Id.

Therefore, companies have been searching for improved ways to effect materials delivery, including, for example, by employing last-mile package delivery devices such as cargo delivery cycles, and wherein autonomous vehicles for materials delivery are being used and considered more and more every day.

US Published Patent Application, Pub. No. 2018/0024554 A1 to Brady et al., for Autonomous Ground Vehicles Based At Delivery Locations, teaches autonomous ground vehicles ("AGVs") for containing materials retrieved from transportation vehicles (e.g., delivery trucks) for delivery to specified locations (e.g., user residences). As shown in FIGS. 2A and 2B of that published application, an AGV may either have a single access door or multiple access doors. The AGV of Brady includes a battery power module that is removably mounted at the bottom of the AGV and which provides power for propulsion of the AGV, control (i.e., locking and unlocking of storage compartments) and providing of information relating to storage compartments of the AGV, and for input/output devices attached to the AGV.

The transfer of merchandise to last-mile delivery vehicles in the field is currently accomplished wherein larger trucks, such as semi-trucks meet up with cargo-bikes in a free area, such as at a large parking area at a central location where cargo-bikes can receive containers to enable riders to deliver the contents of the containers via their materials delivery vehicles. And while AGVs have been taught in the prior art, currently there isn't much happening in the way of implementation of materials delivery via last-mile delivery via AGVs to customers, except some few markets wherein last-mile food (i.e., Pizza) delivery is actually being accomplished. However, in PCT Patent Application, Ser. No. PCT/US2021/39641 to Eric Fosgard, there is described a system whereby automated transfer from mass transit vehicles to last-mile delivery materials delivery vehicles (i.e., cargo-bikes and AVs) is facilitated at appropriately-located TULIPS stations. Exemplary prior art e-cargo bikes and AVs are shown in FIGS. 1 and 3 hereof.

Velove Bikes AB, a Swedish company, provides for cargo-bike transportation and delivery of containerized materials. In Velove's system, parcels are placed in containers at a sorting terminal at major package delivery carrier distribution centers, for pickup by a large vehicle (i.e., a truck or cargo van) for transporting the containers to handover points (neighborhood hubs) where, thereafter, riders on e-cargo bikes in the neighborhood hubs are enabled to pick up the containers to make last-mile deliveries to local residential and business addresses. This method of delivering materials is more efficient and sustainable than other current practices using larger delivery trucks to make such last-mile deliveries.

A large part of the early e-cargo bike market has been powered with sealed lead-acid (SLA) battery technology. As the market has transitioned to newer and lighter versions of Li-ion battery chemistry, more complex control systems have been required. To accommodate increased power requirements, manufacturers have consistently increased the voltage of the Li-ion battery packs to increasingly higher levels, such as 54V nominal, and as a result of design challenges requiring stepping down of such higher voltages with DC-DC converters so as to be usable with varying electronic components, have arisen concerning providing lower power requirements for e-cargo bike subsystems. Further, as e-cargo bikes have evolved to accommodate last-mile package/materials delivery cargo traffic, larger power requirements for given tasks have been placed on the e-cargo bikes' batteries, which in turn has necessitated additional regular maintenance and numerous charging cycles to the e-cargo bikes' batteries.

Of course, when batteries have become discharged, the entire e-cargo bike, or AV, system is required to be put out of service until a lengthy charging process has been completed, and accordingly there has developed an increased need for a way to keep e-cargo bikes in more consistent service. As mentioned previously, a primary way to try to provide a solution for this need has been to increase the voltage and/or the size of the on-board batteries of the e-cargo bikes. A problem with increasing voltage is that it requires additional subsystems to reduce the load on more sensitive electronics, whereas adding more batteries increases the overall weight of the system in an already weight-sensitive environment.

Merely increasing the nominal voltage, and hence battery size, for the overall battery of the e-cargo bike or AV has not been an ideal solution, since it has increased the complexity of associated power systems, and this has also resulted in additional power losses overall. Further, inefficient power management has also produced excessive heat from the power subsystems, which heat has needed to be dissipated with heat sinks or other cooling systems.

Higher nominal voltages have been designed in an effort to increase power delivery capacity to the e-cargo bike, but these higher voltages have added requirements for DC-to-DC convertors involving conversion, or stepping down, of the now higher direct current voltage to a lower direct current voltage suitable for various auxiliary systems on the e-cargo bike. Such conversions have been, at best, 90% efficient, but more likely 80% efficient. This means that much of the added potential power provided has been consumed as having been lost as heat in the conversion process. Therefore, that lost power has not been available to power the e-cargo bike or AV. Furthermore, adding DC-DC convertors as necessary to accommodate the larger nominal voltage designs has increased the cost of the power system, and this has mitigated the value of having increased the nominal voltage and power of the battery in the first place.

Furthermore, the common practice of having increased the size of battery packs for e-cargo bikes and AVs has increased the weight of systems, thus having limited the maximum cargo weight carrying capacity possible for the systems. Still further, having increased the nominal voltage of battery packs for e-cargo bikes and AVs generally has increased their down-time experienced while charging their battery packs. Thus, in general as expected, designing to increase power for e-cargo bikes and AVs has led to undesirable design/engineering tradeoffs.

It should be noted that other design features for e-cargo bikes and AVs have had either positive or negative effects on the amount of energy needed, or available, for the e-cargo bikes/AVs, so that designing lightweight e-cargo bikes and AVs for maximum performance, perhaps optimized for range, power system efficiency, discharge rate, ambient temperature, and so forth, has affected the useful energy in the e-cargo bikes'/AVs' batteries for materials delivery. And as power efficiency of the power subsystem for e-cargo bikes and AVs has degraded, with increased nominal voltages and battery sizes provided, the lifecycle of both the electronics and the battery systems for the e-cargo bikes and AVs has also degraded, thus reducing the useful lives of e-cargo bikes and AVs generally.

The amount of time it has taken to recharge an e-cargo bike, or an AV, has depended on multiple factors including battery chemistry, temperature during charging, degree of discharge, and charging system design. And while, responsive to existing issues associated with an increased demand for battery power on e-cargo bikes and AVs emphasis has been placed on increasing Li-Ion battery capacity to provide the longest run-time in the smallest physical size, there may be times when a longer battery life is more important than battery capacity. Thus, in such cases, indeed in most, if not virtually all, cases, optimizing the system for maximum battery life may present the best alternative for business bottom lines using battery systems for commercial users of e-cargo bikes and AVs for the delivery of materials. Further, of course, optimizing battery life effectively means less Lithium and other minerals need to be mined, which serves to alleviate the human and environmental costs associated with the mining process.

In other words, overall long-term maintenance of e-cargo bike and AV cargo delivery vehicle power systems should be considered when analyzing actual costs of delivery of materials. Further, choice of charging methods have played a role in extending battery life. Thus, while fully charging of e-cargo bikes and AVs batteries may maximize the run-time on a per-trip basis (at least for batteries having been used less), thus allowing them to be run a maximum amount of time, e.g., a full day (again at least for batteries having been used less), this method and degree of charging can be detrimental to the overall useful life, or lifecycle, of the batteries. In the alternative, it is well-known that using only 20% or 30% of batteries' capacities before recharging them (sometimes referred to as "shallow discharge") will extend batteries' lifecycles in terms of numbers of charge cycles. Thus, it is known that when considering the useful lives of batteries, five to ten shallow discharge cycles have been identified as the equivalent of one full discharge cycle. Thus, an increased number of charge cycles has been determined to be likely to produce a more cost-effective long-term solution for e-cargo bikes, AVs, and their power systems.

Further, charging the batteries midday for e-cargo bikes and AVs takes them out of service when they are needed most, whereas current trends with battery-powered delivery vehicles (e-cargo bikes and AVs) instead has suggested charging their batteries to their fullest capacity, to have kept the e-cargo bikes and EVs in service for as long as possible, for example for an entire day. Whereas, if e-cargo bikes and AVs have been returned to their charging stations and have been left to charge overnight, keeping the batteries in a fully charged state in this way has resulted in a significant reduction in these batteries' lifecycles.

If an e-cargo bike or an AV has needed a charge and has therefore been put out of service during a needed time, the charging time has been reduced by increasing charge current. But while having used a higher charge current has also reduced battery life, having used lower charge current charging methods have required more time. Presently there has not been discovered any safe method for fast charging of a standard Li-ion battery to 100% capacity in less than one hour. Further, Li-Ion batteries have not been recommended for charging if the ambient temperature has been outside the recommended charging temperature range of 0° C. to 40° C.

In summary, while there are known materials delivery containers for use by e-cargo bikes and AVs to make last-mile deliveries, problems concerning availability of these vehicles during charging of their batteries have arisen. Of course, it is desirable from an efficiency and profitability standpoint to have the e-cargo bikes and AVs in service as much as possible, but prior art systems have negatively impacted their availability for making deliveries, as they have been taken out of service while their battery systems have been recharged. Again, this is not ideal from an efficiency or a profitability standpoint.

One method of addressing this problem has been to have more bikes or AVs than necessary for demand, such that having some bikes or AVs in charging stations is not too much of a hindrance to materials delivery needs. Another method of addressing this problem has been to make the batteries for the bikes and AVs removable, and therefore rechargeable as detached from the bike or AV, so that other fresh battery systems may be continually used with the bike or AV to keep it in service—and this has presented as a cumbersome, and additional weight-bearing, task to manage the carrying of extra batteries.

A related problem arises in that, to minimize the downtime for e-cargo bikes and AVs, efforts have been made to charge their batteries more quickly (e.g., fast charging). The problems with this approach are that, the e-cargo bike or AV is still taken out of service while being charged (albeit for a shorter period of time during a faster charge), fast charging the batteries for these vehicles unduly negatively impacts the longevity of the batteries. The batteries thus wear out faster, and this is considered wasteful and expensive. As another matter, efforts to push these vehicles (e-cargo bikes and AVs) and their batteries to longer and longer performance times also unduly negatively impacts the longevity of the batteries, as it is known that over-discharging such batteries kills battery life. In other words, as there has been a tendency towards higher and higher battery voltages to meet the ever-increasing demands for last-mile e-cargo bike delivery, there have been needed higher and higher operating voltages, which have increased danger to the operator, have increased the expense of the battery systems and other electronics, and they have caused such waste (resulting in excess heat generated) by putting an extra-heavy load on system electronics. This tendency, driven by needs to accommodate the increased demands of cargo delivery, has caused lithium-ion battery systems and electronics systems to be more expensive and to experience undue wear and tear generally.

Pre-loading and setting of the order of delivery of materials in a container is known, such that, in effect a package delivery company sorts packages according to their delivery destinations, and the company loads the packages in a container destined for the local area in which the packages' final destinations are located. Further, the delivery company provides a shipping manifest (e.g., an electronic list of packages, associated delivery addresses, and other delivery instructions, downloaded to a delivery person's smart device or an AVs computer) to the delivery driver, or vehicle, so that they may efficiently deliver the materials in the container along a predetermined and most-efficient route.

Thus, the use of battery-powered, electric-assist, materials/cargo delivery cycles operated by a human operator (e-cargo bikes), and battery-powered materials delivery autonomous vehicles (AVs), each for last-mile delivery of materials (such as packages and products) and containers containing a plurality of such materials have been known in the prior art. But there also have been known problems relating to the batteries for such e-cargo bikes and AVs, and charging/discharging the same.

Given the needs for last mile e-delivery cycles that can stay in service for an entire day, there has been highlighted a need for a method of power management that does not compromise the battery through excessive charging cycles, yet keeps the E-Delivery Cycle in service for the entire time required.

Known Resistance Calculations Useful in Determining Power Consumption of Prior-Art e-Cargo Bikes The forces affecting e-cargo bike and AV efficiency calculations are known to be gravity, rolling resistance, and aerodynamics. Also, frictional forces in vehicle components themselves, such as chains, gears, bearings, and the like could also be considered in such calculations. However, for present purposes these minor factors may be effectively factored in as an overall efficiency for the bike.

The first known force to consider, Gravity, is known to create resistance to e-cargo bikes and AVs when they are climbing a hill, and to push the e-cargo bike and AV vehicles forward when they are descending a hill. Thus, the grade of the road on which the vehicles is traveling should be considered, and grade is calculated by the rise in the road divided by the distance travelled along the road. The grade is then multiplied by weight of the vehicle to determine the force of gravity on the vehicle traveling on a given grade or road.

For example, it may be determined that a 600-pound e-cargo bike (combined cycle weight, container weight, cargo weight, and optional driver weight) on a 3% grade would produce 18 lbs. of force in essence holding the vehicle back. And since weight is a unit of mass, not a unit of force it must be converted into a unit of force in Newtons. Since the force applied will hold back the vehicle or push the vehicle forward, the vector for force due to grade is parallel to the earth's surface. Newtons (N) are thus calculated using the conversion: Fw (weight)=m (mass)*g (gravity, that is 9.8 m/s^2) where 9.8 m/s^2 is the gravitational constant. A known slight adjustment needed for the gravitational constant based on actual latitude of the point of measurement and the actual elevation of the point of measurement (i.e., for changes in geography) may be ignored in this instance.

The second known force to consider, rolling resistance, pertaining to e-cargo bikes and AVs may be calculated by multiplying the weight of the vehicle by a number that gives the force of the coefficient of rolling resistance. Both tire construction and aerodynamics contribute to the rolling resistance coefficient. Knobby tires would have a higher rolling resistance coefficient than a smooth road tire. Measurements of rolling resistance due to tire construction are difficult because road conditions will also affect the outcome and are not as predictable as tire construction on a standard.

Aerodynamics also plays a role in overall rolling resistance, as specific e-cargo bikes and AVs encounter air resistance upon cutting through the air during vehicle travel. Air resistance velocity is calculated using ground speed plus the speed of any head wind (or minus speed of any tail wind). Other factors include air density (calculated from temperature and pressure). Pressure is affected by altitude, so that the higher the altitude of the delivery route, the lower the air pressure and hence the lower the resistance. Finally, the frontal area of the vehicle determines the amount of resistance (Cd) present to a specific e-cargo bike or AV. A flat plate has a Cd of 1.00 while a very aerodynamic e-cargo bike or AV could have a Cd of less than 0.25.

The formula for calculating aerodynamics is as follows:

$$\vec{F}d = -\frac{1}{2} \rho v^2\, Cd\, A$$

Where: $\vec{F}d$ is the rolling resistance to a specific vehicle; P is the air pressure, v is the velocity of the bike, Cd is the coefficient of resistance for the bike, and A is the area presented by the front of the vehicle.

As mentioned previously, there are also known other losses, or resistances, associated with vehicle travel, including losses due to friction, such that when applying power to pedals of the vehicle, friction in bearings, chains, sprockets, derailleurs, and shoe-to-pedal interface, all determine how much of the available power actually makes it to the pavement. Because these factors are difficult to measure from one e-cargo bike, or AV, to the next, the system of the present disclosure uses an estimated constant of 5% loss due to friction.

In summary, once the foregoing three forces of resistance are known, namely that of gravity, rolling resistance, and aerodynamics, including applying the aforementioned estimated constant for friction, the power required to maintain a certain speed is computed. In an e-cargo bike or AV delivery route, speed anticipated by the entire route predicts an estimated time required to complete each segment of the delivery.

DISCLOSURE OF INVENTION

In accordance with an aspect and embodiment of the disclosure, there is provided a combined container and battery system adapted for materials delivery of container contents using a battery-powered last-mile materials delivery vehicle, comprising a container adapted for containing materials to be delivered to one or more locations. The system further comprises a battery system in the container and adapted for providing power necessary for the last-mile materials delivery vehicle to accomplish delivery of the contents of the container.

Preferably, the combined container and battery system comprises a battery system that interchangeable with any of a plurality of containers. In other words, the battery system is preferably easily removable for recharging, swapping with another already charged battery system, and the like.

Further, preferably, the combined container and battery system in accordance with this aspect of the disclosure further comprises a control system for the container adapted for receiving materials information and delivery information, the control system facilitating any one of delivery vehicle choice, battery charging, and delivery status communication.

The container control system is adapted to receive information pertaining to materials to be delivered within the container for a shipment along a specific delivery route, and determines a minimum charge level needed considering such factors as chosen vehicle weight and efficiency, battery system capacity, materials information, materials weight, number of stops, distance between each stop, and route topology, and at least one of an allowed driver weight and driver efficiency for e-cargo bike deliveries. Additionally, the container control system is also preferably adapted to communicate an appropriate level of charge needed for the particular shipment in the container for the specific route, whether to a charging station control system or to another entity such as a server and back-end charging control system, and may also be adapted to receive and communicate recipient information and recipient address to a delivery vehicle control system or other entity such as a server and an application interface.

Further, optionally, the container control system may be further adapted to inform a system, such as a server or an application via a wireless or wired connection, or an operator or vehicle control system for display to an operator, about any availability of excess power in the battery system for auxiliary tasks. Thus, for example, in a case where the battery system is charged to its fullest extent per battery specifications, but the container doesn't require that much charge to be delivered, the container control system is able to notify the system or operator of additional power available for auxiliary tasks. Such auxiliary power indicated as available may be used for accomplishing any of a plurality of auxiliary tasks, comprising: to electronically display branding information, to electronically display third-party advertising information, to power rented equipment delivered by the vehicle to a customer, and to provide mobile power to consumers.

Thus the combined container and battery system, in accordance with another aspect of the disclosure, may be adapted for providing additional power to accomplish at least one of a plurality of auxiliary tasks comprising: to electronically display branding information, to electronically display third-party advertising information, to power rented equipment delivered by the vehicle (for example in the container) to a customer, and to provide mobile power to consumers.

And while the combined container and battery system of any of the foregoing aspects of the disclosure may be used with an autonomous materials delivery vehicle (an AV), it will also be appreciated that the combined container and battery system may specifically be used with a battery-powered human operated e-cargo cycle adapted for materials delivery, wherein the degree of charge to be imparted to the battery system is dependent upon parameters associated with e-cargo cycle container delivery.

These parameters associated with e-cargo cycle container materials delivery may comprise any of cargo cycle, driver, and loaded container weight; cargo cycle efficiency; anticipated route length, topology, and number of stops; ambient temperature; battery chemistry, battery system capacity, battery system safe charge and discharge levels, existing battery system charge level; and anticipated auxiliary tasks.

In those cases where the combined container and battery system is used for materials delivery using a battery-powered materials delivery autonomous vehicle (AV), the degree of charge to be imparted to the battery system may be dependent upon parameters associated with AV container delivery, and such parameters may comprise any of the AV and loaded container weight; AV efficiency; anticipated route length, topology, and number of stops; ambient temperature; battery chemistry, battery system capacity, battery system safe charge and discharge levels, existing battery system charge level; needed container access control power; and anticipated auxiliary tasks.

In accordance with another aspect and embodiment of the disclosure, there is provided a last-mile materials delivery vehicle adapted for accommodating a container having a battery system adapted for providing power to accomplish delivery of contents of the container. The delivery vehicle comprises one of a human-operated battery-powered materials delivery cycle and a computer-operated materials delivery autonomous vehicle (AV), the materials delivery vehicle having a physical interconnection of the container to the materials delivery vehicle, and an electrical interconnection of the container to the materials delivery vehicle.

A preferred embodiment of the materials delivery vehicle comprises a controller, and preferably the container also comprises a controller, wherein the controllers are adapted for communicating information relating to delivery and delivery status between them. The electrical interconnection for providing power and the system for communicating information use the same interconnection. Further, preferably, the materials delivery vehicle is capable of being powered primarily by the container battery while the container is interconnected to the vehicle.

The materials delivery vehicle of this aspect and embodiment of the disclosure may comprise either an AV, or a battery-powered human-operated cargo delivery cycle, wherein the onboard computer provides a communications interface for displaying sequential delivery instructions and navigation to the operator of the delivery cycle and for communicating status of delivery information to the container controller.

In accordance with an aspect and embodiment of the disclosure, the delivery vehicle's computer is adapted for receiving communication of delivery information from the container controller, comprising: delivery route; materials count, ID, weight, delivery address, delivery instructions, delivery priority, and delivery status.

In an embodiment, the e-cargo bike computer is adapted for communicating delivery status information to the container controller for later use by an originator of delivery materials.

In accordance with another embodiment of and aspect of the disclosure, the delivery vehicle comprises a computer-operated materials delivery autonomous vehicle (AV), wherein the AV further comprises an onboard computer for controlling execution of sequential delivery instructions, delivery information, navigation, and status information as needed to deliver the materials and provide delivery status information. In this embodiment and aspect, the delivery vehicle thus comprises a computer-operated materials delivery autonomous vehicle (AV) wherein the AV further comprises an onboard computer for communicating sequential delivery instructions, delivery information, navigation, and status information to and from the container controller as needed to deliver the materials and provide delivery status information.

In accordance with another aspect and embodiment of the disclosure, there is provided a battery system charging system adapted for facilitating charging of a container battery system for last-mile delivery of materials contained in a container. The battery charging system in accordance with this aspect of the disclosure comprises a control system and a charging interface, wherein the control system facilitates fully charging of a container battery system. The interface and control system of such a battery charging system may be adapted for charging a plurality of battery systems.

In accordance with an aspect and embodiment of the disclosure, a charging system control system may communicate with a container battery control system to determine the power necessary for the battery system within battery optimal charging and utilization parameters to complete a given anticipated delivery of a specific container load for a specific anticipated delivery route as per a delivery manifest and facilitates charging of the container's battery system according to the determination.

In an embodiment, the control system of the charging system may protect against excess discharging of the container's battery system by providing adequate power in accordance with a power budget needed for the given anticipated delivery route per the manifest and the container control system. Or, optionally, the control system may simply fully charge the battery.

The various aspects and embodiments of the systems of the disclosure address the long-felt need to minimize too fast of charging of battery systems and the need to avoid over-discharging of battery systems for e-cargo bikes and AVs. Further, the systems provided in accordance with one or more aspects of the disclosure allow for materials delivery vehicles, whether e-cargo bikes or AVs, to stay in service for longer periods, approaching even an entire delivery shift, and this is achieved without the need for increasingly larger batteries and in a way that does not compromise the battery through excessive charging cycles, again while maintaining the delivery vehicle in service for the entire time required. That said, it will be appreciated that varying cities and municipalities may have differing objectives to meet regarding space utilization on sidewalks depending on the circumstances of pedestrian traffic, bike traffic, density considerations and the like. For example, some particularly busy cities may even prefer to limit AV traffic to times of the day when pedestrian traffic is at a minimum. Thus, by optimizing power utilization, the system of the present disclosure will help ensure availability of needed power to last-mile delivery vehicles as delivery schedules may vary according to particular city or municipality needs.

It will be appreciated that charging of battery systems in containers may be accomplished anywhere in the process of delivery and/or return of a container, whether by or at an originator of material/package deliveries, by intermediate container handlers, by a retail establishment, by last-mile delivery stations (e.g., a TULIPS station as described in PCT Patent Application No. PCT/US2021/39641 to Eric Fosgard), on-board a mass transit vehicle, such as a bus, or a train, or even on-site at a delivery recipient location (such as at a community event), all without departing from the invention as claimed in the concluding portion of this specification.

It will be appreciated by those skilled in the art that there are various possible combinations of the above-described elements and sub-elements for various embodiments of the invention, whether such elements and sub-elements be combined in whole or in part, which may be employed without departing from the scope and spirit of the invention as claimed. Thus, for example, this invention provides.

The subject matter of the present invention is particularly pointed out and distinctly claimed in the concluding portion of this specification. However, both the organization and method of operation, together with further advantages and objects thereof, may best be understood by reference to the following descriptions taken in connection with accompanying drawings wherein like reference characters refer to like elements.

BRIEF DESCRIPTIONS OF DRAWINGS

Figure 2:
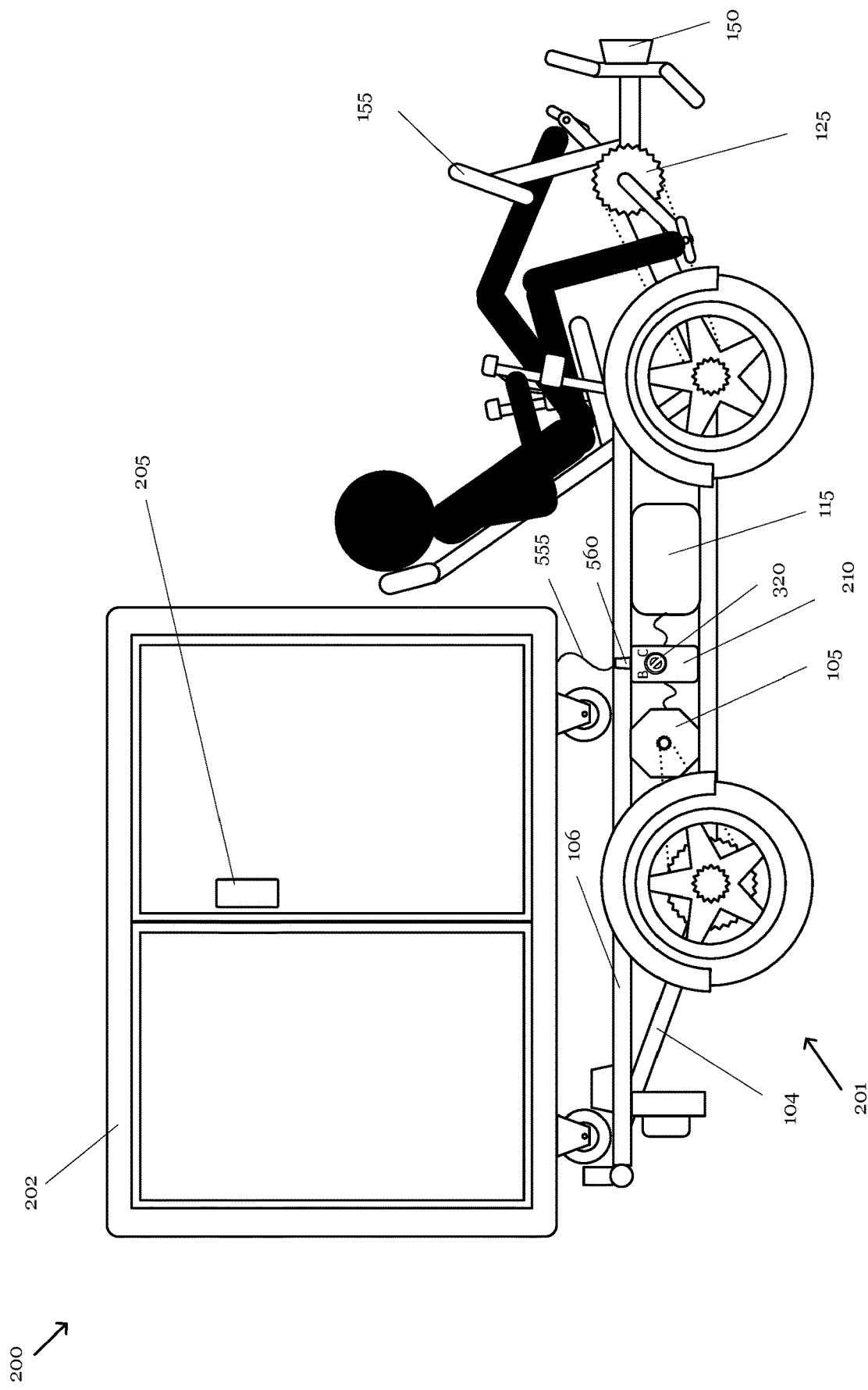
Figure 3:
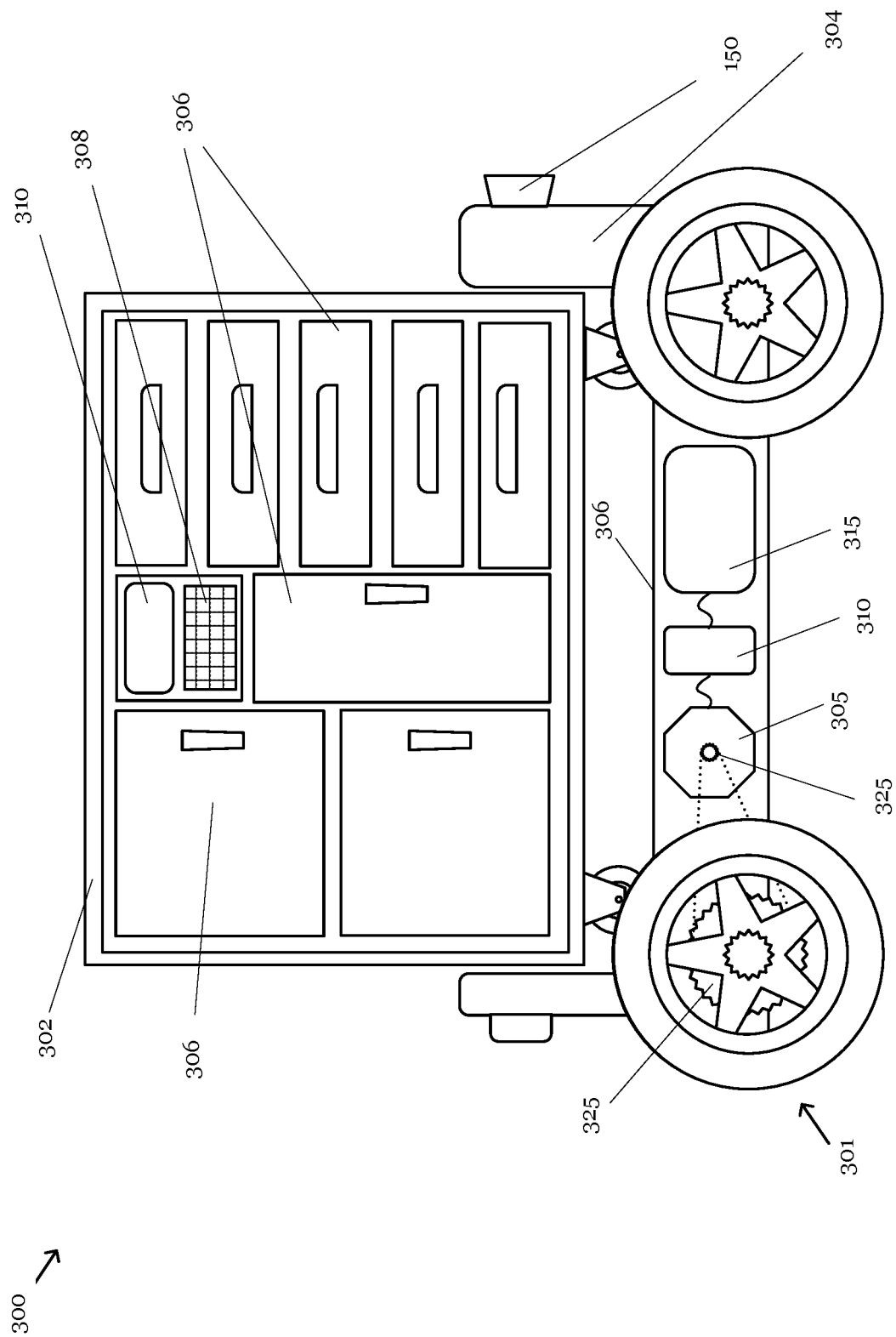
Figure 4:
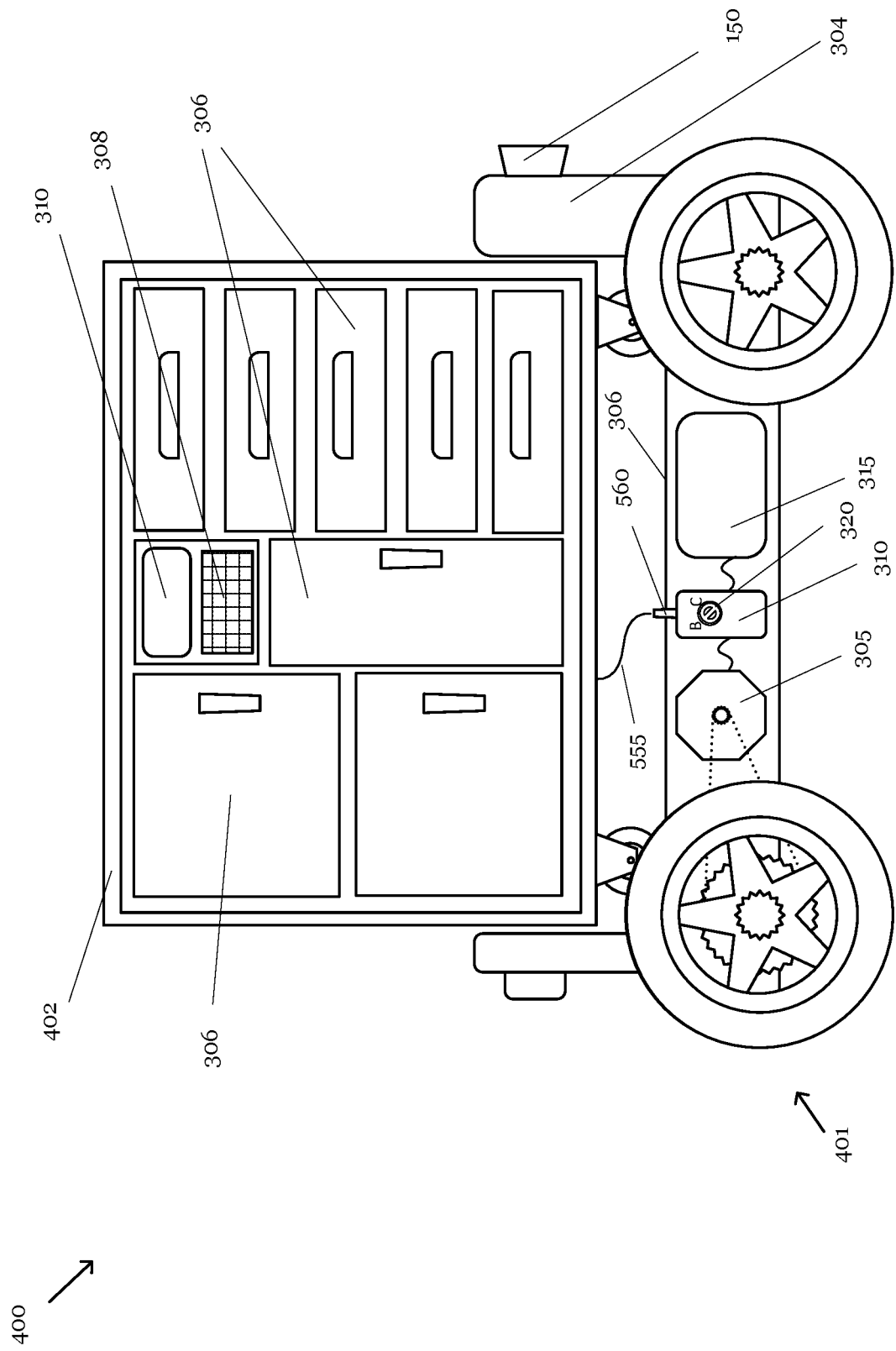
Figure 5:
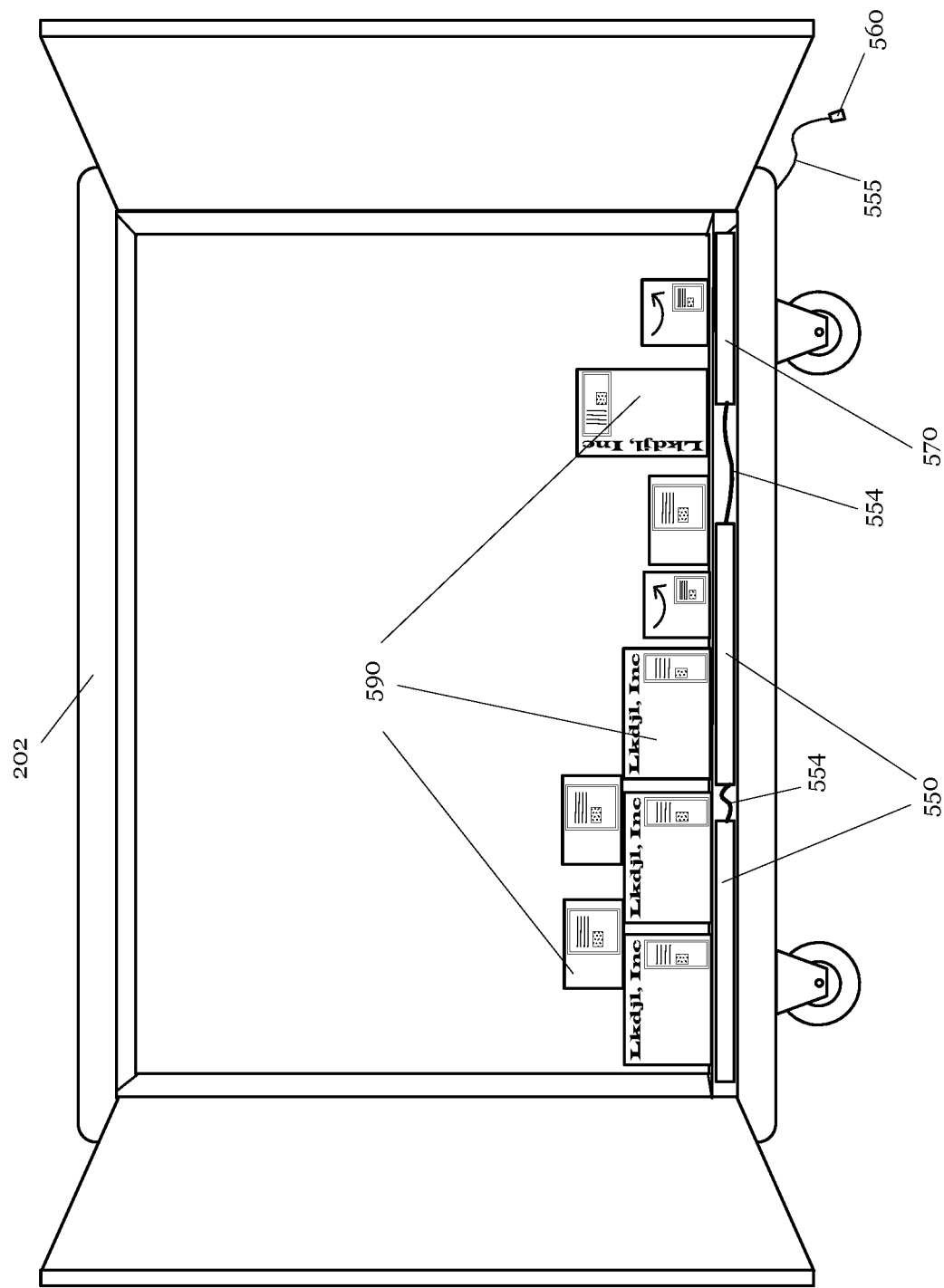
Figure 6:
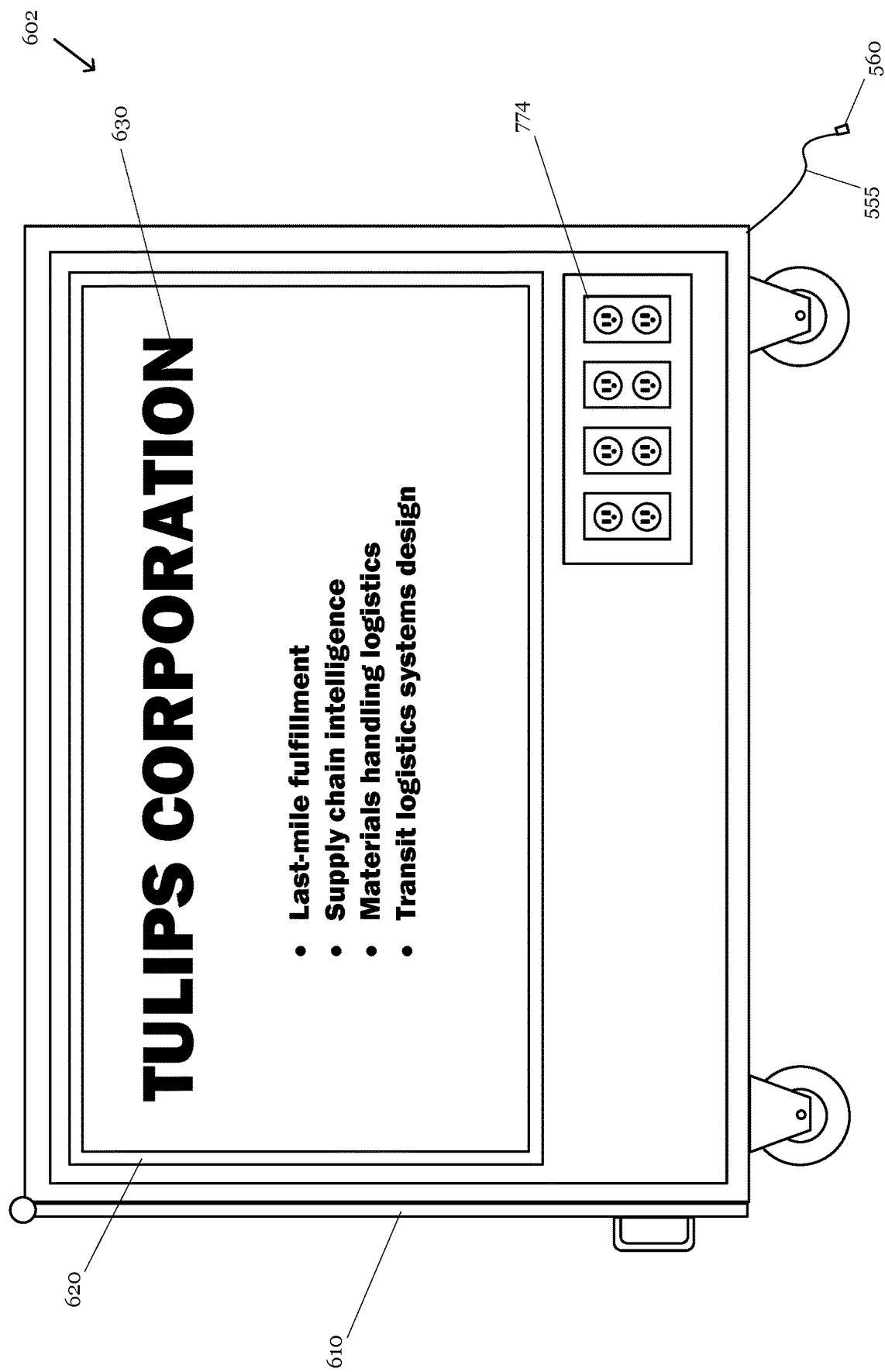

FIG. 2 is a side view of an embodiment of a smart e-cargo bike last-mile delivery system comprising a smart delivery container for last-mile delivery of materials and carried on an e-cargo bike, wherein the smart delivery container is adapted for providing battery power to provide motivational force and other electrical requirements to the e-cargo bike, as well as other electrical requirements for the container, such as optionally for auxiliary power, in accordance with aspects and an embodiment of the disclosure;

FIG. 3 is a side view of a prior-art battery-powered autonomous vehicle (AV) last-mile delivery system having an AV with a container thereon, wherein the container has a plurality of electronically-controlled discreet lockably-accessible boxes therein for last-mile materials delivery;

FIG. 4 is a side view of a smart AV last-mile delivery system comprising a smart delivery container carried on a smart AV, wherein the smart delivery container is adapted for providing battery power to provide motivational force and other electrical requirements to the smart AV, as well as other electrical requirements for the container, such as for container access control or optionally other auxiliary power, and wherein the container has a plurality of electronically-controlled discreet lockably-accessible boxes therein for last-mile delivery, in accordance with aspects and an embodiment of the disclosure;

FIG. 5 shows a smart delivery container with materials (e.g., packages) therein for last-mile delivery, wherein the container has side doors to allow access to the materials, and further wherein there are shown a plurality of re-chargeable chemical cell batteries and a microcomputer stored in lower compartments of the container, the batteries and the microcomputer being electrically interconnected and having an electrical connector for connecting the batteries to provide power to provide motivational force and other electrical requirements, such as for data communications, to one of an e-cargo bike or an AV;

FIG. 6 shows a smart delivery container for last-mile delivery of materials accessible through a rear door of the container, wherein the container comprises a plurality of chemical-cell batteries and a microcomputer (not shown), the batteries and the microcomputer being electrically interconnected via an inverter to AC sockets for providing auxiliary power, and also having an electrical connector, wherein the batteries are adapted to provide electrical requirements, such as for data communications to an electronic advertising display on the side of the container or to provide motivational force and/or a display on one of an e-cargo bike or an AV used for carrying the container.

Figure 7A:
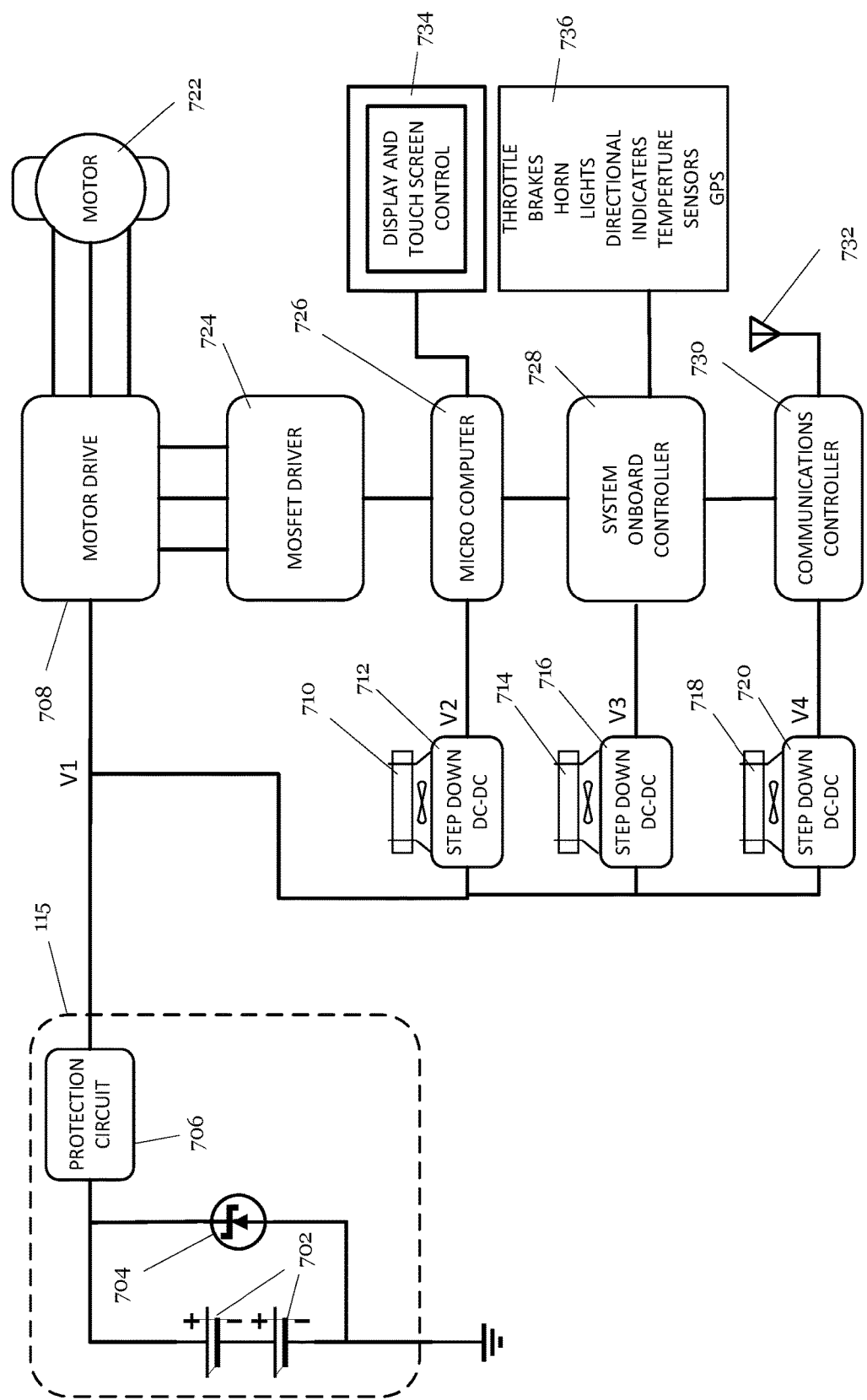
Figure 7B:
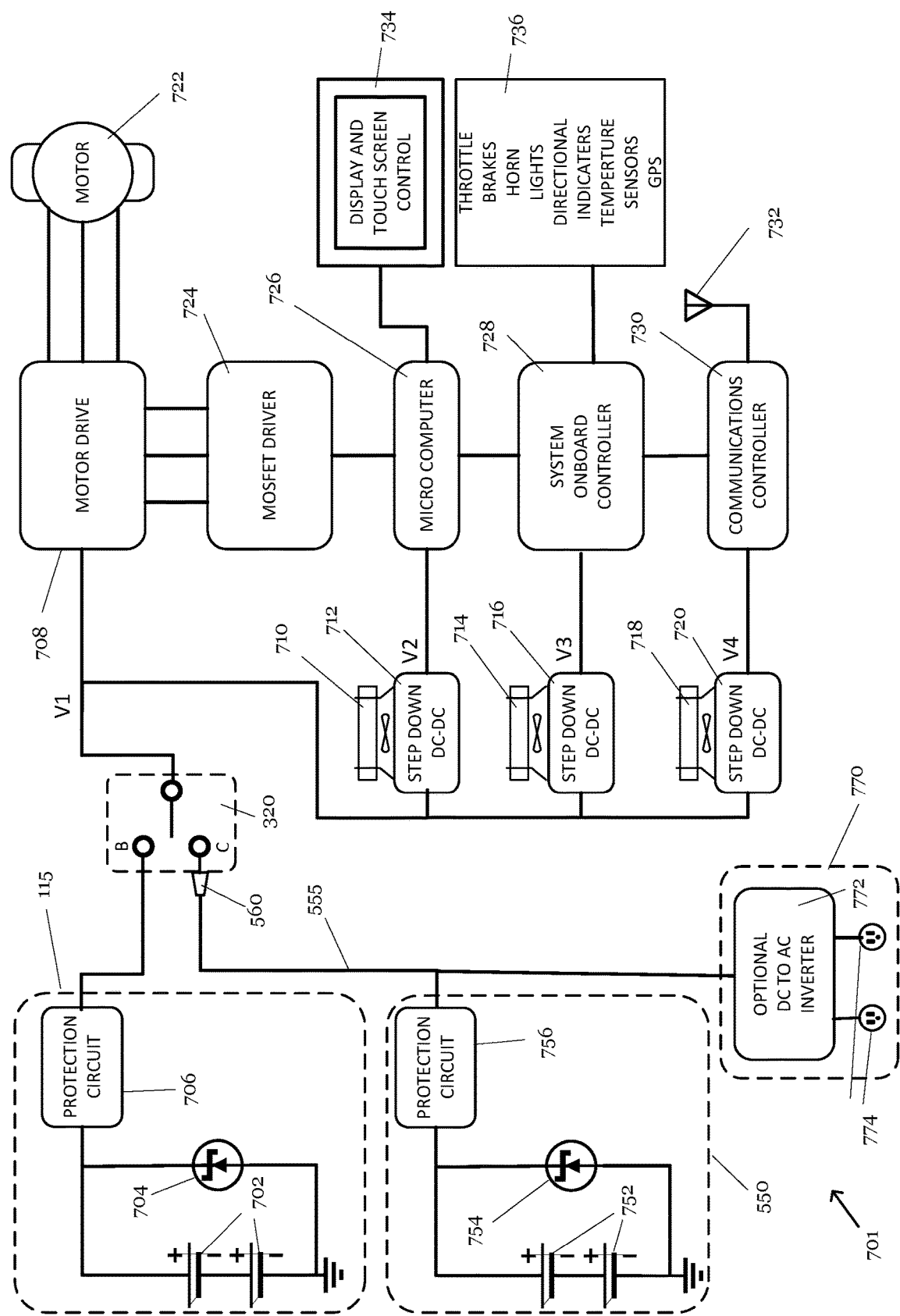
Figure 8:
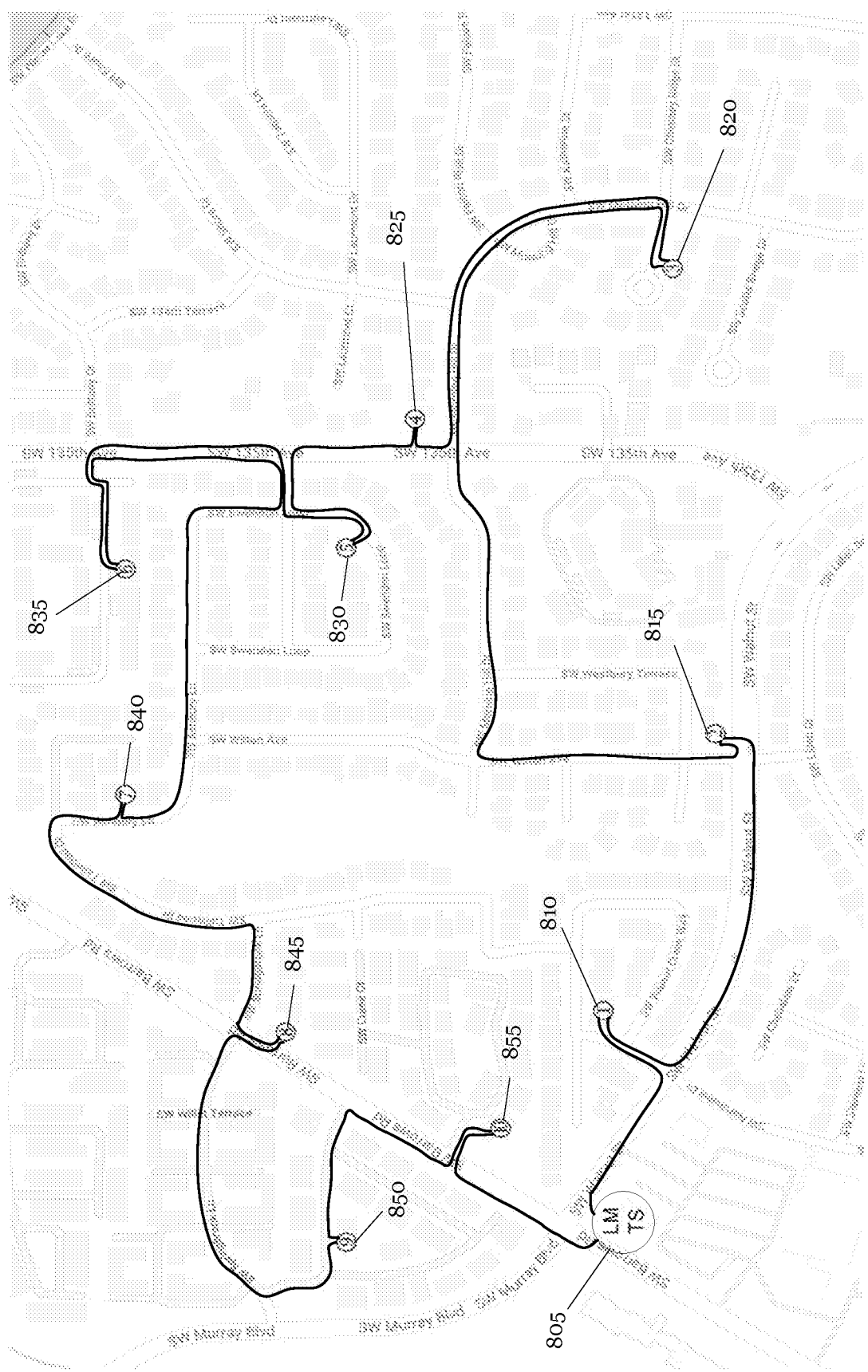
Figure 11A:
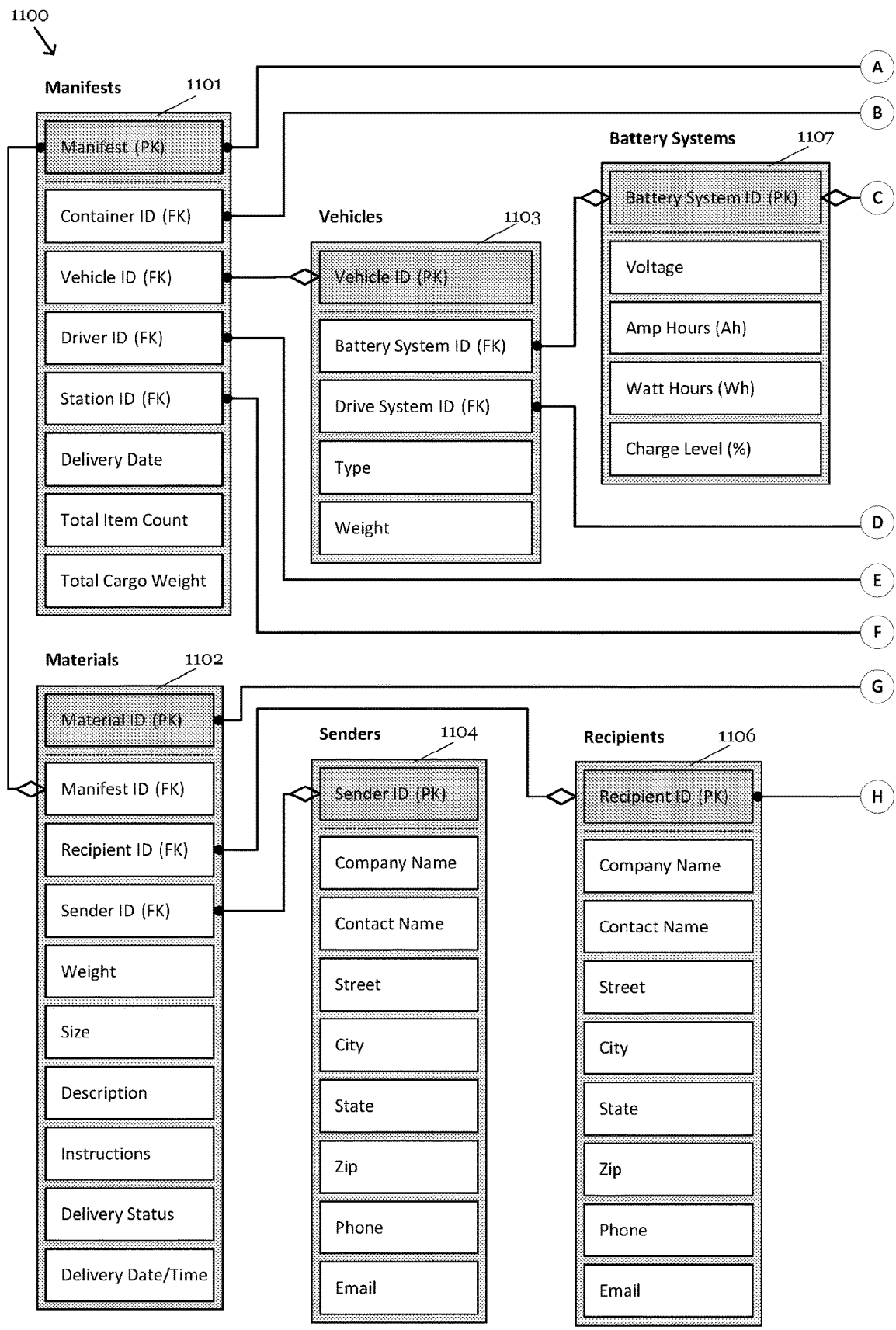
Figure 11B:
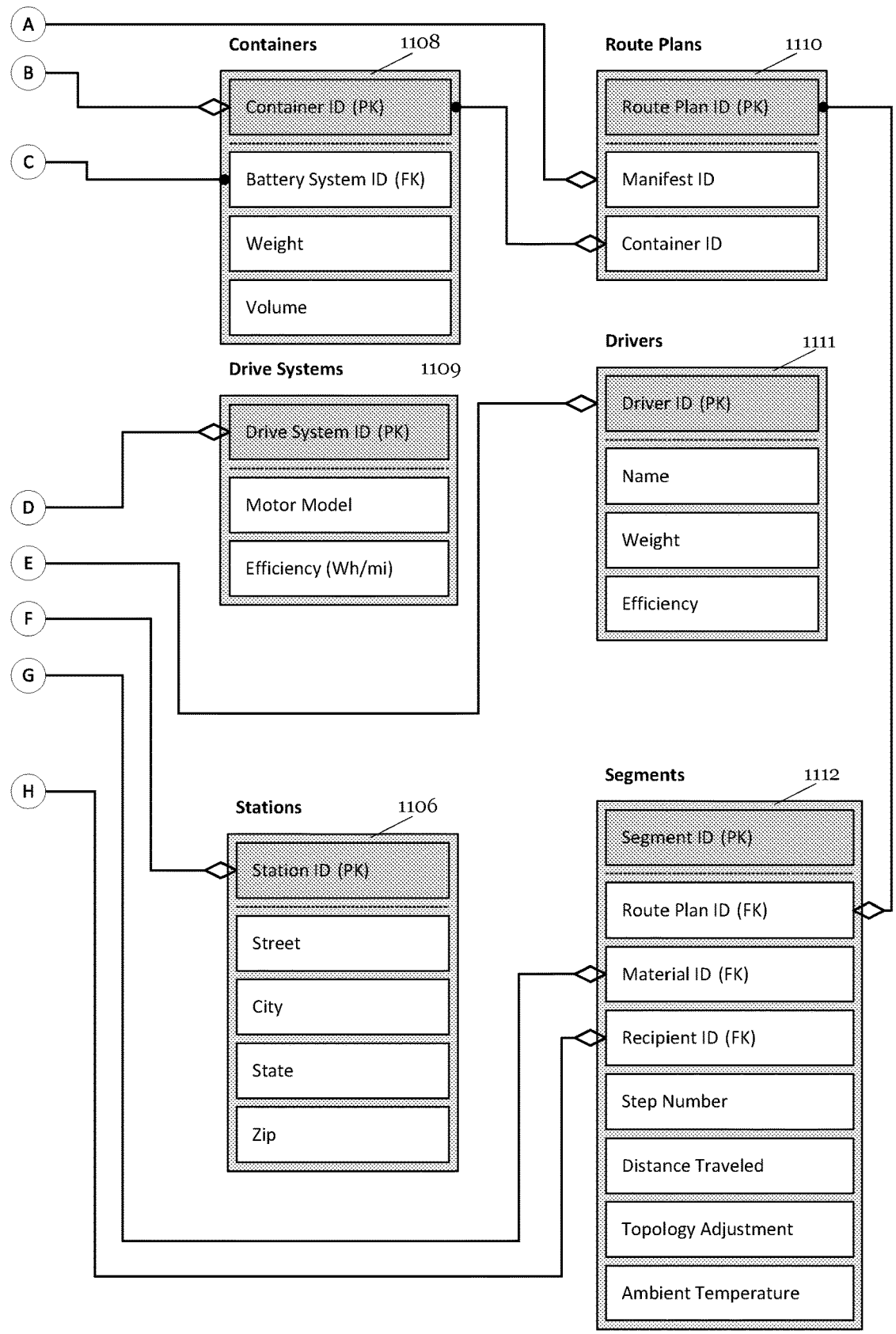
Figure 12:
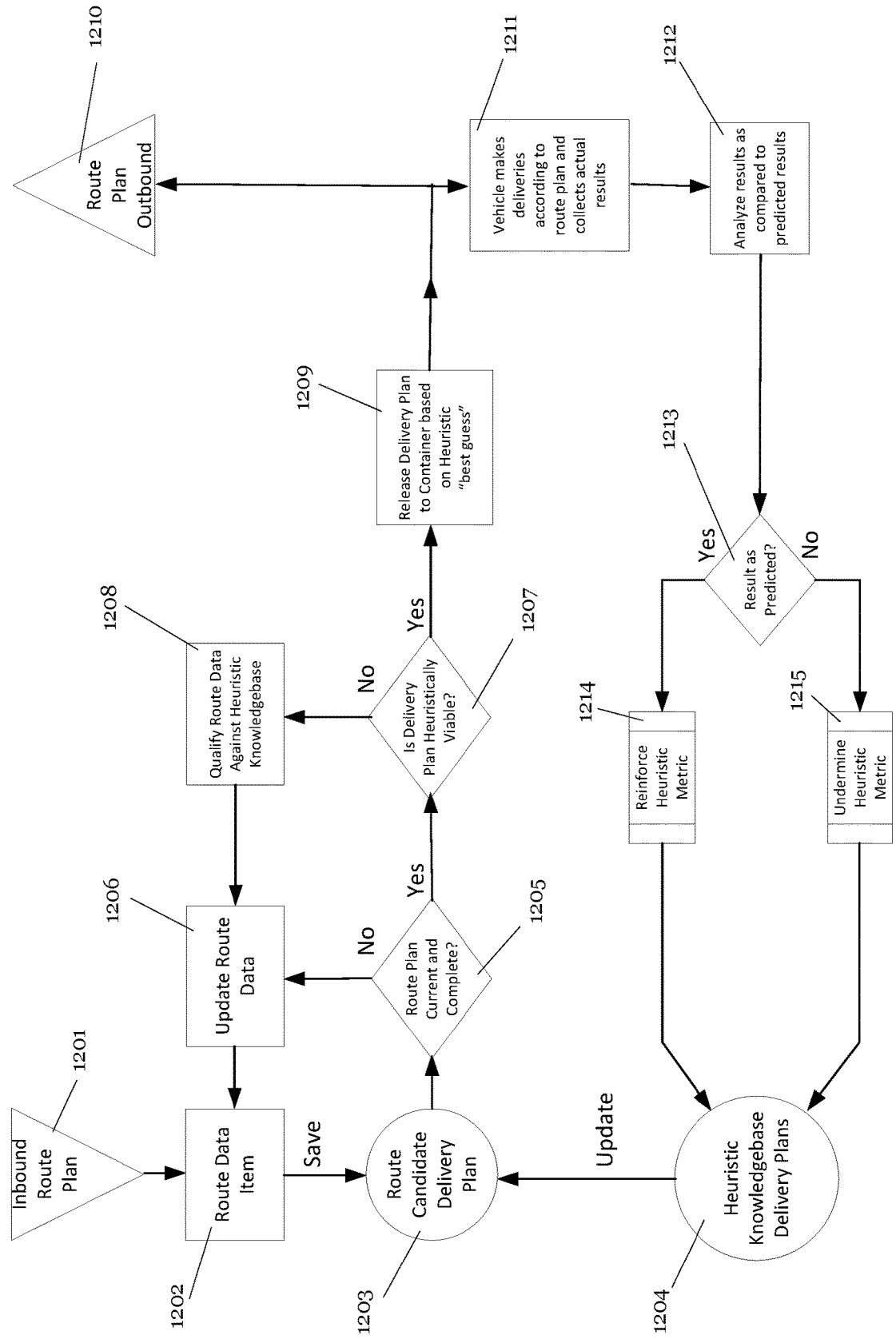
Figure 13A:
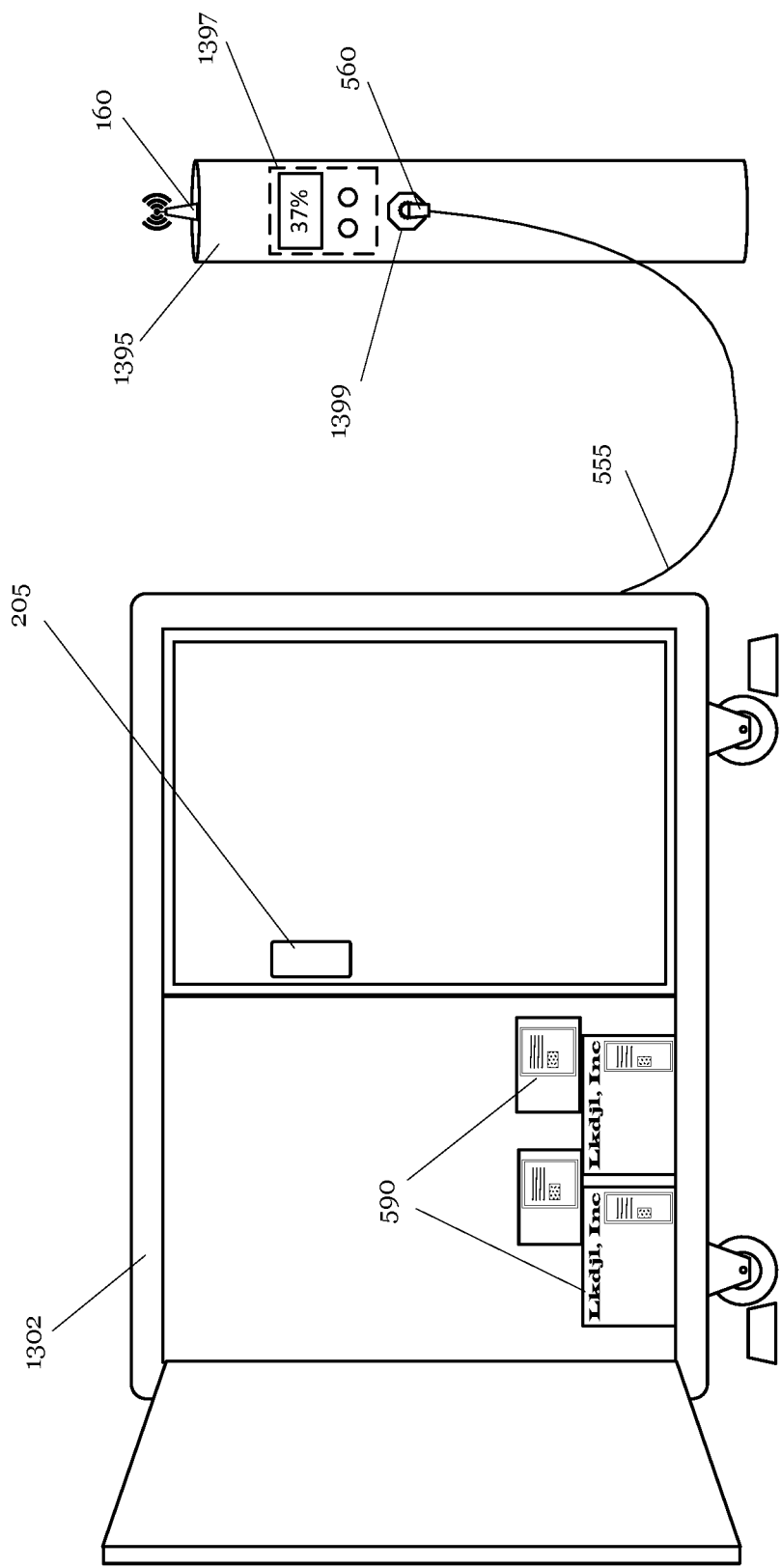
Figure 13C:
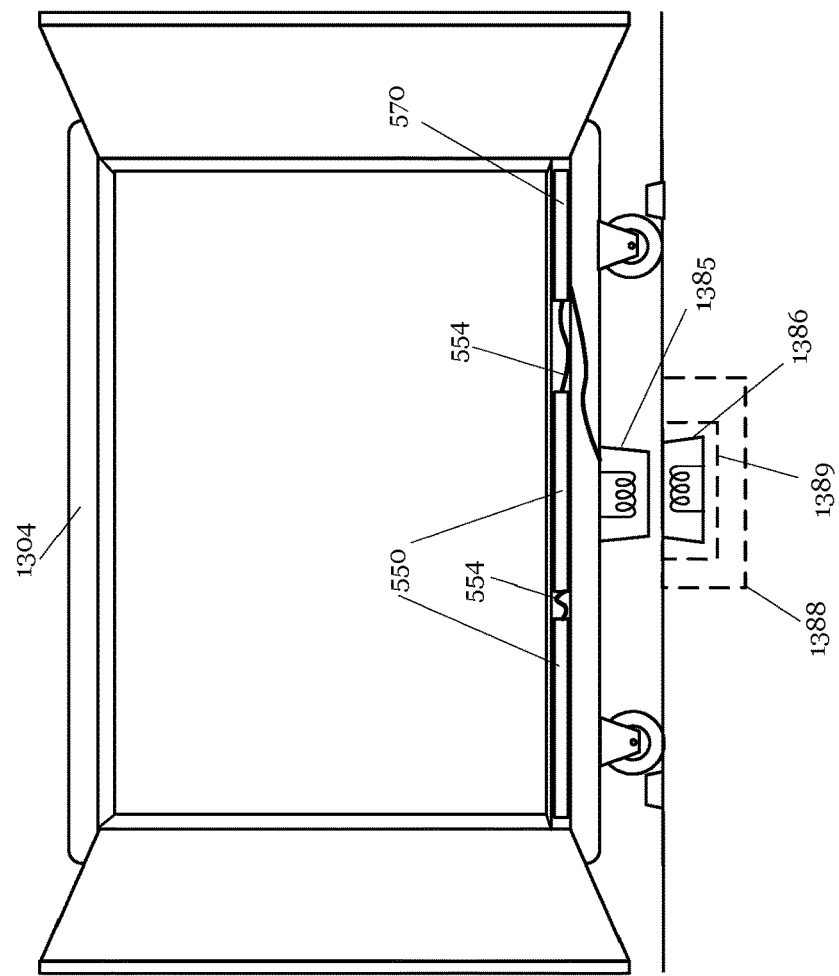
Figure 13B:
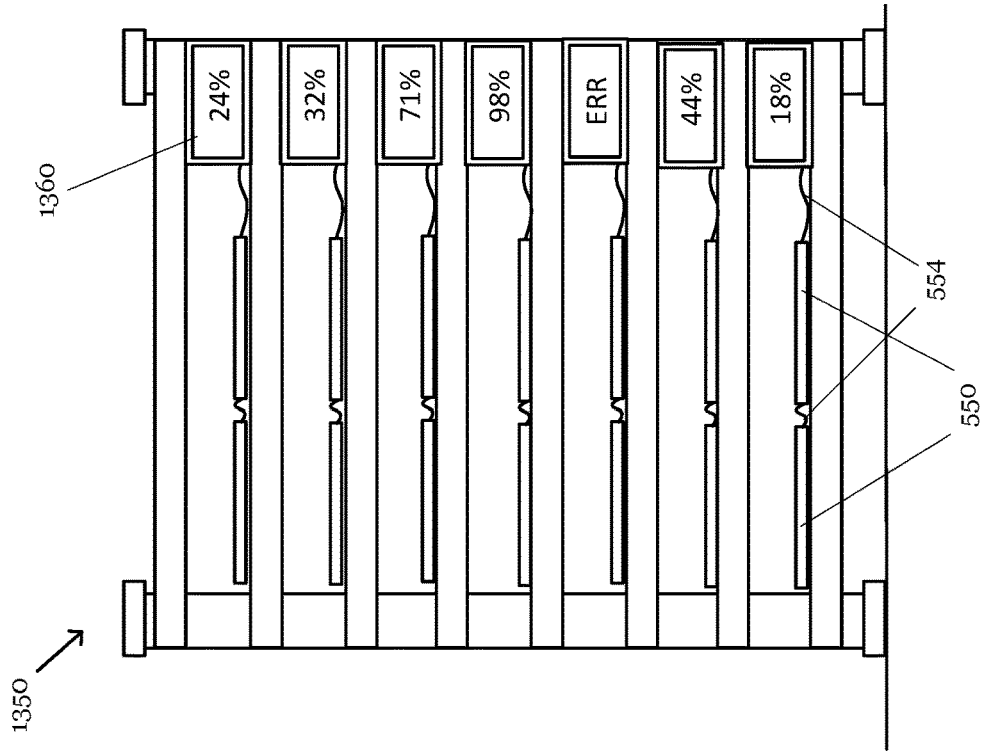

FIG. 7A shows a prior art motor control system for powering either an AV or an e-cargo bike with a battery;

FIG. 7B shows a motor control for a smart container powered delivery system having the ability to switch to battery power from an on-board battery of an AV or an e-cargo bike to battery power from a battery system on-board a materials delivery container, the motor control system also shown having an optional inverter adapted for converting direct current battery power to AC power for optional auxiliary power purposes;

FIG. 8 shows a sample delivery route map with various stops, for either package drop-off or pickup, which begins and ends at a last-mile transfer station LMTS;

FIG. 9A is part of a data table, or materials delivery manifest, for a partially-loaded smart container, the manifest having a plurality of product/materials delivery addresses therein corresponding to the sample delivery route map of FIG. 8, and wherein the table shows distance between stops on the delivery route, elevation gain in feet between stops, and the average slope of paths/street ways between stops along the route;

FIG. 9B is a continuation of the data table, or materials delivery manifest, of FIG. 9A, further showing estimated time between stops, material ID numbers, material weights, total remaining weight (weight to next), and calculations of estimated power in watts/hour needed to deliver between stops, estimated power used for each stop, remaining power, and state of charge (SOC);

FIG. 10A is part of an alternate data table, or materials delivery manifest, for a fully-loaded smart container, the manifest having the same plurality of product/materials delivery addresses therein corresponding to the sample delivery route map of FIG. 8, wherein the table shows distance between stops on the delivery route, elevation gain in feet between stops, and the average slope of paths/street ways between stops along the route;

FIG. 10B is a continuation of the alternate data table, or alternate materials delivery manifest, of FIG. 10A, further showing estimated time between stops, material ID numbers, material weights, total remaining weight (weight to next), and calculations of estimated power in watts/hour needed to deliver between stops, estimated power used for each stop, remaining power, and state of charge (SOC);

FIGS. 11A and 11B together comprise an entity relationship diagram for operating, managing, and controlling the system of the present disclosure, wherein there are shown the interrelationship of a plurality of databases, comprising manifests, materials, vehicles, senders, recipients, stations, battery systems, containers, drive systems, route plans, drivers, and route segments, and wherein matching letters A-H are used to show continuation of relationship lines from FIG. 11A as they continue onto to FIG. 11B;

FIG. 12 is a flowchart showing the analysis of route plan predicted data being compared to actual route metrics to check accuracy of a given route plan, using accuracy measurements in a heuristic operation to reinforce more accurate predicted data items and to undermine less accurate predicted data items, to improve the overall accuracy of the system in predicting power consumption for a particular route;

FIG. 13A illustrates a container with a battery system being charged at a charging station in the field;

FIG. 13B illustrates a charging station as might be used in a warehouse for charging multiple battery systems to be inserted into containers; and FIG. 13C illustrates a container adapted to be charged by an inductive charging system, for example, on a mode of mass transit, near a parking lot, at a transfer station, or at a mass transit station.

MODES FOR CARRYING OUT THE INVENTION

Figure 1A:
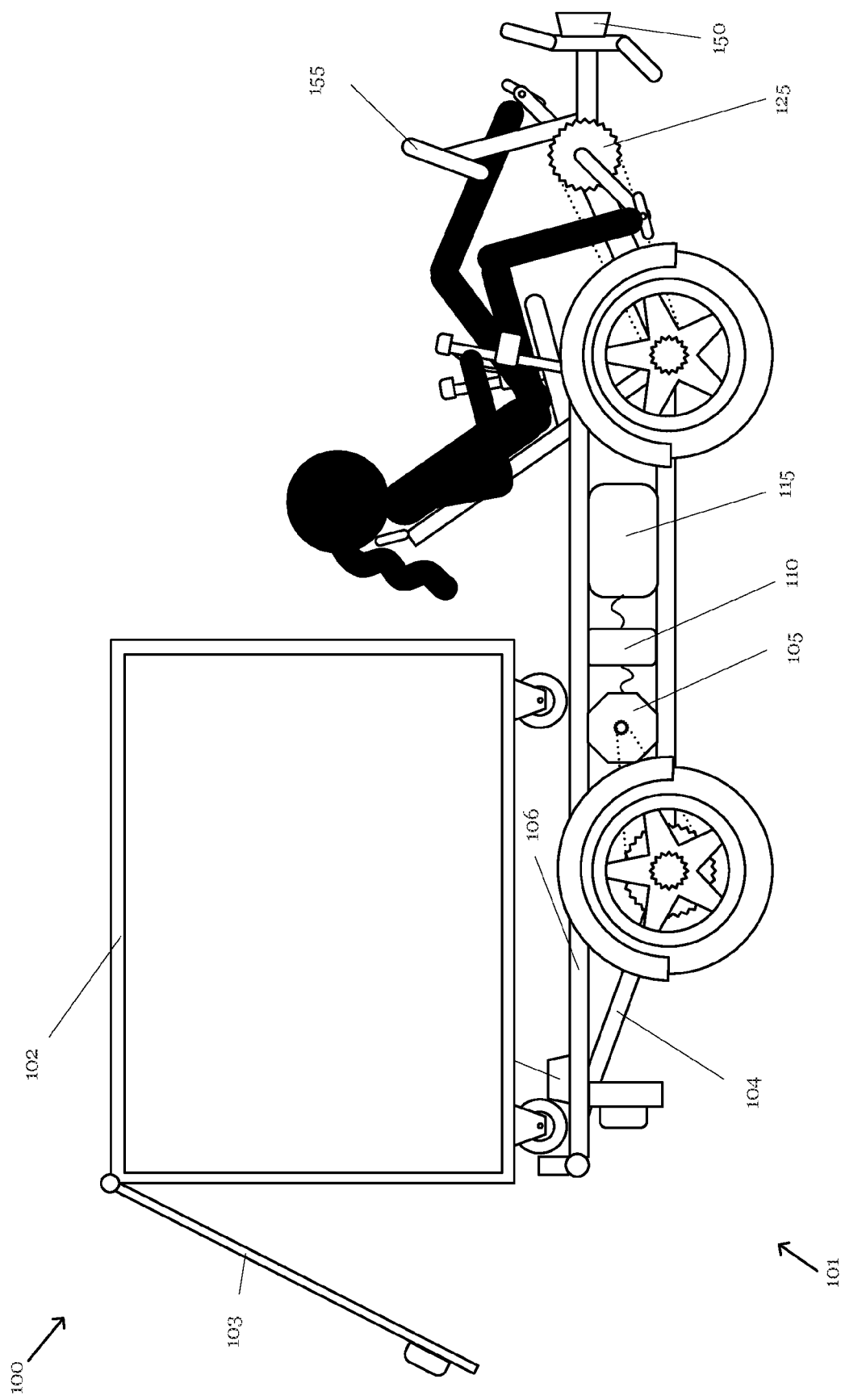
FIG. 1A is a side view of a prior-art electrical-and-human-powered e-cargo bike last-mile delivery system having an e-cargo bike with a rear-loadable container thereon for last-mile materials delivery.
Figure 1B:
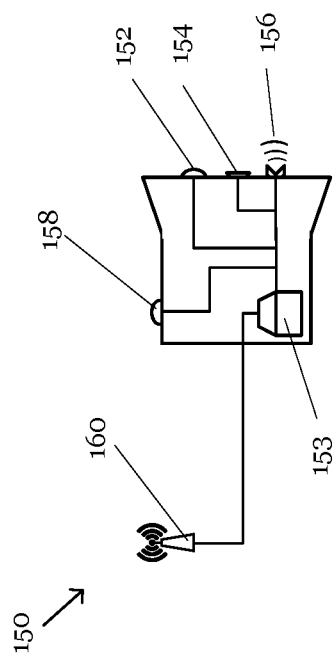
FIG. 1B is a block diagram of a prior-art sensor array 150 used with prior-art e-cargo bikes and autonomous vehicles (AVs) adapted for last-mile materials delivery.

Referring to FIGS. 1A and 1B, there is provided a prior art electrical-and-human-powered e-cargo bike last-mile delivery system 100. The system 100 includes an e-cargo bike 101 (which conventionally could have four wheels or three wheels) having a frame 104 and a cargo bed 106 adapted for supporting a prior art materials delivery container 102. This prior-art container 102 has a rear-loadable access door 103 so that the driver can get materials (e.g., packages) out of the container to hand-deliver them to a consumer recipient. The e-cargo bike 100 has a display 155 for an operator to provide directions and other information to assist in the delivery of materials in the container 102. The e-cargo bike 100 also has a motor 105, a battery 115, and a bike and motor control system 110 with an on-board microcomputer for directing power from the battery to control the display 155 and the motor. The e-cargo bike 101 also has a crank-shaft and sprocket 125 typical of such bikes to allow the driver to input human power as well as to provide motivational force for the bike. FIGS. 1A and 1B show that some e-cargo bikes 101 have a guidance system 150, which as further shown in FIG. 1B, comprises a sensor array 151, controlled by an on-board computer 153, and including a video camera 154, LIDAR 156, a GPS sensor 158, an antenna 160, and any other electronic components necessary for bike (or AV) location and navigation.

Referring to FIG. 2, there is shown a side view of a smart last-mile delivery system 200 in accordance with an aspect and embodiment of the disclosure, comprising a smart container 202 carried by a smart last-mile delivery vehicle 201, such as an e-cargo bike 201 (of either a four-wheel, or three-wheel type). As with prior art systems, the e-cargo bike 201 comprises a frame 104, and a cargo bed 106. The smart delivery container 202 is adapted for providing battery power from a battery system 550 (not shown in FIG. 2, but shown in FIG. 5) onboard the container 202 to provide motivational force to the e-cargo bike 201 via a motor 105 and motor control system 210, as well as potentially providing power to other auxiliary electrical requirements for the container 202 or e-cargo bike 201 as described further herein below.

The e-cargo bike 201 on-board chemical cell battery 115, bike and motor control system 210, and motor 105 are similar to prior art systems 101, but unlike the prior art systems of e-cargo bike 101, the bike and motor control system 210 of the e-cargo bike 201 is a switchable battery source bike and motor control system capable of being switched at a switch 320 between "B" for a bike on-board battery 115, or switched to "C" wherein power may be supplied from a battery system 550 contained in the container 202 via the power and communications cord 555 and connector 560.

While the power provided by the battery system 550 of the container 202 to the e-cargo bike 201 is provided via a cord 555 and a connector 560, all in accordance with aspects and an embodiment of the disclosure, data provided by the container controller 570 (see FIG. 5) may be provided wirelessly, the same cord 555 and connector 560 (i.e., either multiplexed on the same wire, or via multiple wires and connector pins in a single cord and connector), or less-preferably another separate cord and connector (not shown).

Thus, it will be appreciated that when switch 320 is moved to "C", signifying switching to container battery system 550 power, data communications from an onboard container controller (discussed further hereinafter in connection with FIGS. 5 and 11) to the e-cargo bike 201 are also enabled. The battery system 550 is preferably adapted to be easily removable from the container 202 to be easily and readily rechargeable and swappable with another already-charged battery system 550. Further, it will be appreciated that the switching taking place at motor control system 210 may be either manual, electro-mechanically operable, and/or automated by other electronic control system of the e-cargo bike 201 without departing from the spirit of the invention as claimed.

The container 202 is accessible by the driver of the e-cargo bike 201 through side-doors 205. However, it will be appreciated by those of ordinary skill in the art that top, rear, or other door configurations may be used without departing from the invention as claimed.

The e-cargo bike 201 comprises a display 155 readable by the driver during last-mile delivery operations to guide the driver on a specified route. Further, as with prior-art e-cargo bikes 101, e-cargo bike 201 also has a crank-shaft and sprocket system 125 typical of such bikes to allow the driver to input human power as well to provide motivational force to the bike.

The e-cargo bike 204 uses a guidance system 150 (an example embodiment of which is shown in FIG. 1B) comprising a sensor array 151 having one or more of an on-board computer 153, a video camera 154, LIDAR 156, a GPS sensor 158, and an antenna 160 to enable enhanced services in addition to the location and navigation services available with prior art materials delivery vehicles, such as automated delivery status data logging to enable actual delivery statistics feedback to the system 200 to enable heuristic improvements to the system over time as further described in connection with FIG. 12 below.

The container 202 preferably may be provided with an antenna 162 connected to the container control system 570 as known to enable communication between the container control system and outside systems, such as a server, a communication system, or an application. Such an antenna 162 is useful since, for example, the state of charge of the container's battery system 550 and communication of added power needs, or auxiliary power needs, may be communicated back and forth between the outside system to facilitate real-time determinations of availability of container battery system 550 power over and above that needed for deliveries, such as for auxiliary or other purposes (e.g., such as for optional lighting of panels of the container 202 for advertising purposes during night time delivery hours). Such communications via antenna 162 also enable updating of state of charge information during charging of the battery system 550 to an outside system to facilitate decision making and planning of usage of the container during certain hours of the day (thus allowing for extending of charging or determining sufficiency of charge), for example during off-peak hours and/or during lower light hours as described previously. Thus, persons could query a server as to whether there are containers available with sufficient charge in an area to put out an ad (or other notice) in the area and then to wirelessly send display information (contents, font, text size) to the container control system for display on the container.

Referring to FIG. 3, there is provided a prior-art battery-powered autonomous vehicle (AV) last-mile delivery system 300 having an AV 301 and a last-mile delivery container 302 thereon, wherein the container has a plurality of electronically-controlled discreet lockably-accessible boxes 306 therein adapted for last-mile materials delivery. Access to the discreet lockably-accessible boxes 306 of last-mile delivery system 300 is provided by an electronic keypad 308 and display 310 so that via the keypad (or for example with a mobile phone application) individual consumers are enabled in accessing materials contained within the boxes as the AV pulls up to their doorstep to deliver the materials.

The AV 301 (which typically has four wheels, though there are existing other wheel configurations as well) has a frame 304 and cargo bed 306 adapted for supporting the materials delivery container 302. The AV 301 has an AV and motor control processing unit 310 for receiving and controlling the AV based on delivery instructions received electronically, e.g. via an electronic adapter or wirelessly, from a package delivery source company. The AV 301 also has a motor 305 and a battery 315. The motor control processing unit 310 directs power from the battery 315 to control the AV and the motor 305. The AV 301 has a sprocket 325 typical of such AVs to allow motivational force to be applied by the motor to the AV. The AV 301 also has a guidance system 150, similar to the guidance system detailed in FIG. 1B, comprising a sensor array 151 further comprising one or more of an on-board computer 153, a video camera 154, LIDAR 156, a GPS sensor 158, an antenna 160, and any other electronic components necessary for AV) location and navigation.

Referring now to FIG. 4, there is shown a side view of a smart last-mile delivery system 400 in accordance with an aspect and embodiment of the disclosure, comprising a smart container 402 carried by an AV 401, wherein the smart delivery container is adapted for providing battery power to provide motivational force and other electrical requirements to the AV, as well as other electrical requirements for the container, such as for container access control or optionally other auxiliary power. Preferably the smart container 402 has a plurality of electronically-controlled discreet lockably-accessible boxes therein for facilitating consumer access during last-mile delivery, either via a keypad 308 and display 310, or via a smartphone application, all in accordance with aspects and an embodiment of the disclosure;

As with prior art systems, the AV 401 comprises a frame 304, and a cargo bed 306. The smart delivery container 402 is adapted for providing battery power from a battery system 550 (not shown in FIG. 4, but shown in FIG. 5 with a similar container 202) onboard the container to provide motivational force to the AV 401 via a motor 305 and motor control system 310, as well as potentially providing power to other auxiliary electrical requirements for the container 402 or AV 401 as described further herein below.

The AV 401 on-board chemical cell battery 315, AV and motor control system 310, and motor 305 are similar to prior art systems of AVs 301, but unlike the prior art systems of AVs 301, the AV and motor control system 310 of the AV 401 is a switchable battery source AV and motor control system capable of being switched at a switch 320 between "B" for an AV on-board battery 315, or switched to "C" wherein power may be supplied from a battery system 550 contained in the container 202 via the power and communications cord 555 and connector 560.

While the power provided by the battery system 550 of the container 402 to the AV 401 is provided via a cord 555 and a connector 560, all in accordance with aspects and an embodiment of the disclosure, data provided by the container controller 570 (see FIG. 5) may be provided wirelessly, the same cord 555 and connector 560 (i.e., either multiplexed on the same wire, or via multiple wires and connector pins in a single cord and connector), or less-preferably another separate cord and connector (not shown).

Similar to prior-art AVs 301, the AV 401 comprises an on-board chemical cell battery 115, a motor control system 310, and a motor 305, but the motor control system 310, unlike prior art AV motor control systems, is a switchable battery source motor control system capable of being switched at a switch 320 between "B" for on-board battery 315, or "C" wherein power may be supplied from a battery system 550 (not shown in FIG. 4, but shown in FIG. 5) contained in the container 402 via the power and communications cord 555 and connector 560.

Thus, it will be appreciated that when switch 320 is moved to "C", signifying switching to container battery system 550 power, data communications from an onboard container processor (discussed further hereinafter in connection with FIG. 5) to the AV 401 are also enabled. The battery system 550 is preferably adapted to be easily removable from the container 202 to be easily and readily rechargeable and swappable with another already-charged battery system 550. Further, it will be appreciated that the switching taking place at motor control system 310 may be either manual (e.g., upon placing a container 402 onto the AV 401), electro-mechanically operable, and/or preferably, in the case of an AV 401, automated by other electronic control system of the AV, without departing from the spirit of the invention as claimed.

The AV 401 uses a guidance system 150 (an example embodiment of which is shown in FIG. 1B) comprising a sensor array 151 having one or more of an on-board computer 153, a video camera 154, LIDAR 156, a GPS sensor 158, and an antenna 160 to enable enhanced services in addition to the location and navigation services available with prior art materials delivery vehicles, such as automated delivery status data logging to enable actual delivery statistics feedback to the system 200 to enable heuristic improvements to the system over time as further described in connection with FIG. 12 below.

The container 402 preferably may be provided with an antenna 162 connected to the container control system 570 as known to enable communication between the container control system and outside systems, such as a server, a communication system, or an application. Such an antenna 162 is useful since, for example, the state of charge of the container's battery system 550 and communication of added power needs, or auxiliary power needs, may be communicated back and forth between the outside system to facilitate determination of availability of container battery system 550 power over and above that needed for deliveries, such as for auxiliary or other purposes (e.g., such as for optional lighting of panels of the container 202 for advertising purposes during night time delivery hours). Such communications via antenna 162 also enable updating of state of charge information during charging of the battery system 550 to an outside system to facilitate decision making and planning of usage of the container during certain hours of the day (thus allowing for extending of charging or determining sufficiency of charge), for example during off-peak hours and/or during lower light hours as described previously.

FIG. 5 shows a smart delivery container 202 with materials (e.g., packages) 510 therein for last-mile delivery, wherein the container has side doors 520 to allow access to the materials. The smart delivery container 202 further comprises one or more re-chargeable chemical cell batteries in a battery system 550 and a container controller 570 stored in lower compartments of the container. The batteries 550 and the container controller 570 are electrically interconnected, and there is provided a cord 555 and a connector 560, all in accordance with aspects and an embodiment of the disclosure, for interconnecting the battery system and container controller to provide power to a materials delivery vehicle, whether a e-cargo bike 201 or an AV 401. Data provided by the container controller 570 may be provided to the materials delivery vehicle either wirelessly, by the same cord 555 and connector 560 (i.e., either multiplexed on the same wire, or via multiple wires and connector pins in a single cord and connector), or less-preferably via another separate cord and connector (not shown).

As with previously described containers 202, and 402, the container 202 in FIG. 5 also preferably may be provided with an antenna 162 connected to the container control system 570 as known to enable the types of communications described previously.

FIG. 6 shows a smart delivery container 602 for last-mile delivery of materials accessible through a rear door 610 of the container, wherein the container comprises one or more chemical-cell batteries in a battery system 550 and a container controller 570 (not shown in FIG. 6, but shown in FIG. 5). The battery system 550 and the container controller are electrically interconnected via an inverter 770 (shown in FIG. 7B) to AC sockets 774 for providing auxiliary power. The battery system 550 is also adapted to provide electrical requirements for a container-powered display 620 on a side (or sides) of the container for providing such things as an advertising message 630 or other electronic data on one or more displays 620. As with other smart containers 202, 402 described herein, container 602 comprises a cord 555 and a connector 560, all in accordance with aspects and an embodiment of the disclosure, for interconnecting the battery system 550 and container controller 570 to provide power to a materials delivery vehicle, whether a e-cargo bike 201 or an AV 401. Thus, as with prior containers 202, 402 described herein, data provided by the container controller 570 may be provided to the materials delivery vehicle either wirelessly, by the same cord 555 and connector 560 (i.e., either multiplexed on the same wire, or via multiple wires and connector pins in a single cord and connector), or less-preferably via another separate cord and connector (not shown).

As with previously described containers 202, 402, the container 602 is provided with an antenna 162 connected to the container control system 570 as known to enable communication between the container control system and outside systems, such as a server, a communication system, or an application. Such an antenna 162 is useful since, for example, the state of charge of the container's battery system 550 and communication of added power needs (such as to light advertising sign 620), or auxiliary power needs via AC outlets 774, may be communicated back and forth between the outside system to facilitate real-time determination of availability of container battery system 550 power over and above that needed for deliveries. Thus, for example, the container control system 570 may communicate its state of charge to a server for the purpose of lighting of signs 620 with an advertising message 630 upon determination that the advertisers advertising campaign allows for such display with associated charges. Otherwise, such communications may direct the control system 570 display another advertisement, or successive advertisements (or public service and/or emergency messages if needed) for certain periods of times. Such communications via antenna 162 also enable updating of state of charge information during charging of the battery system 550 to an outside system to facilitate decision making and planning of usage of the container during certain hours of the day (thus allowing for extending of charging or determining sufficiency of charge), for example during off-peak hours and/or during lower light times when advertising may require additional lighting as described previously. Thus, persons could query a server as to whether there are containers available with sufficient charge in an area to put out an ad (or other notice) in the area and then to wirelessly send display information (contents, font, text size) to the container control system for display on the container.

FIG. 7A shows a prior-art block diagram of system electronics 700 for either an e-cargo bike 101 or an AV 301 having a vehicle (e-cargo bike or AV) on-board battery 702 as part of the battery system 115 having a reverse-polarity protective diode 704 and a protection circuit 706, a known standard circuit for protecting against short circuits in lithium-ion battery systems to prevent fires and to protect against charging too fast, overcharging, or overly discharging the battery. In any of these cases, the protection circuit 706 will shut the battery system 115 down to prevent further damage.

The output voltage of the battery system 115 in FIG. 7A for a prior-art e-cargo bike 101 or AV 301, represented by V1, is sent directly to the motor drive 708. In such prior-art standard systems, the amount of electricity provided to the motor drive 708 is controlled by a microcomputer 726 controlling a MOSFET driver 724. Other systems of the e-cargo bike or AV need power, such as a system onboard controller 728, a communications controller 730, a display and touch screen control 734, and such systems as throttle, brakes, audible warning system such as a horn or other device, lights, directional indicators, temperature sensors, and GPS, as suggested at 736. However, these systems require different operating voltages to operate correctly than the motor drive 708 itself. Accordingly, the higher V1 voltage must be stepped down by DC-DC converters shown at 712, 716, 720. Since different system require different voltages, there are a plurality of such DC-DC converters to accommodate the needs of each system as shown at V2, V3, V4. Since stepping down in this way is an inefficient process, there is often significant heat generated, which requires heat sinks (not shown) and fans 710, 714, 718, to keep the DC-DC converters cool and operational with standard operating parameters. Of course, this extra heat energy dissipated is wasted energy comes from the battery system 115, and it is undesirable. Thus, there has been a tendency towards higher and higher V1 voltages to meet the ever-increasing demands for last-mile e-cargo bike delivery. Higher V1 voltages have increased danger to the operator, the expense of the battery systems and other electronics, and they have caused the aforementioned waste by putting an extra-heavy load on the DC-DC converters 712, 716, 720. This tendency, driven by needs to accommodate the increased demands of cargo delivery, has caused such lithium-ion battery systems and electronics systems to be more expensive and to experience undue wear and tear generally.

FIG. 7B shows system electronics 701, for either an e-cargo bike 201 in accordance with one or more aspects of the disclosure or an AV 401 in accordance with one or more aspects of the disclosure. System electronics 701, unlike system electronics 700, further comprises switching capability with a switch 320 to select one or more additional container batteries 752 as part of a battery system 550 having a reverse polarity protective diode 754. Battery system 550 also includes a protection circuit 756. The switch 320 may be manually-operated, or automatically switched to the container battery system 550 when the container with the battery 202, 402, 602 on-board the container is carried on-board and connected via the cord 555 and connector 560 (shown in FIG. 6) to the smart e-cargo bike 201 or smart AV 401, without departing from the scope and spirit of the invention as claimed.

The e-cargo bike 201 and AV 401 system electronics portion shown in 7B are similar to counterpart systems shown and described in connection with FIG. 7A, except it will be appreciated that having additional battery system 550 power on-board containers alleviates the need to manage charging of vehicle power systems 115, which either results in down-time of the vehicle 201, 401, results in damage to the battery systems because of a need for fast recharging, results in damage to the battery because of a tendency to over-discharge battery systems 115 to complete a delivery plan, or results in operators (in the case of e-cargo bikes 201) needing to carry spare charged batteries which is cumbersome to manage and may add additional weight constraints to efficient delivery.

The protection circuit 756 is similar to protection circuit 706, which in both cases is a known standard circuit for protecting against short circuits in lithium-ion battery systems to prevent fires and to protect against charging too fast, overcharging, or overly discharging the battery. In any of these cases, the protection circuit 706 will shut the battery system 115 down to prevent further damage.

While it will be appreciated that electronics for an e-cargo bike 201, or AV 401, other than the aforementioned switching capability, may be similar to those of prior-art e-cargo bikes 101, or AVs 301, it being the case that in its broadest aspects there is provided herein an alternative power system for last-mile delivery of materials, e-cargo bikes 201 and AVs 401 may optionally comprise additional electronics for facilitating data communications between vehicle system on-board computers and display 734 and container controller 570 to assist with communication of route requirements for the materials that are in the particular container being delivered, as well as facilitating reporting delivery status back to an original shipper and delivery materials recipients. And while it will be appreciated that these functions may be accomplished via an application on a mobile device, such as a smart phone, or via some other wireless connection, they may also be integrated into vehicle electronics, all without departing from the scope of the invention as claimed.

Thus, electronic system 701 also comprises an output voltage V1 of either a battery system 115 or a battery system 550, depending on which battery system is selected at switch 320. V1 is sent directly to the motor drive 708. In such prior-art standard systems, the amount of electricity provided to the motor drive 708 is controlled by a microcomputer 726 controlling a MOSFET driver 724. Other systems of the e-cargo bike or AV need power, such as a system onboard controller 728, a communications controller 730, a display and touch screen control 734, and such systems as throttle, brakes, horn, lights, directional indicators, temperature sensors, and GPS, all as included at 736. However, these systems require different operating voltages to operate correctly than the motor drive 708 itself. Accordingly, the higher V1 voltage must be stepped down by DC-DC converters shown at 712, 716, 720. Since different system require different voltages, there are a plurality of such DC-DC converters to accommodate the needs of each system as shown at V2, V3, V4.

Whereas with prior-art systems 700, there was a tendency towards higher and higher V1 voltages to meet the ever-increasing demands for last-mile e-cargo bike delivery, the present system alleviates this tendency by providing adequate power necessary to make deliveries of materials 590 in a particular container 202, 402, 602 having an on-board battery system 550. In other words, the materials 590 and the container 202, 402, 602 come together with the power necessary to deliver the materials in the container such that changing containers 2-3 times a day for multiple loads allows for right-sizing of the battery systems 550 or their charge states such that the prior tendency to climb to higher and higher voltages of vehicle onboard battery systems 115 (for an e-cargo bike 201) and 315 (for an AV 401) is minimized. Thus, the present disclosure teaches a system that increased safety for delivery operators and reduces the expense of systems and their maintenance—in large part because there is no longer such a great need for heavy stepping down of higher voltages using DC-DC converters 712, 716, 720. Such DC-DC converters may still be necessary with the present disclosure, but the degree of step-down may be greatly decreased. This, in turn, yields efficiencies in the last-mile delivery process and improves the availability of critical delivery vehicles.

As shown as optional in FIG. 7B, there is provided an optional DC to AC inverter system 770 used in a container 602 shown in FIG. 6 comprising and inverter 772 and outlets 774 for providing auxiliary power. The inverter 772 obtains DC power from the container battery system 550, and it converts it to standard voltage, 120V 60 Hz AC US, 230V 50 Hz AC Europe, or some other standard depending on the country in which the container 602 with battery system 550 is employed. Such AC power provided by the container 602 battery system 550 may be used to power AC outlets necessary for auxiliary power to such things as power tools, equipment for mobile/temporary events, audio-visual equipment, lighting, etc. Of course, such equipment may be delivered to a destination, such as community event, a race, a concert, a fair, etc., in the same container that is used to power the equipment. Then, at the end of the event the equipment may be returned in the same container to the provider (e.g., a rental agency).

Referring now to FIGS. 8, and 9A-B, there are shown related figures illustrating dynamics of power consumption over the course of making deliveries in the delivery route map of FIG. 8 corresponding to the tables in FIGS. 9A and 9B, for the purpose of demonstrating how the claimed device and systems provide power and how that power is consumed during the course of a typical last mile delivery route. FIG. 9A includes such corresponding elements as stop number, delivery address (per the map of FIG. 8), distance to next delivery address, elevation, and average slope between delivery address stops. The rows of the table of FIG. 9A continue in FIG. 9B with elements including projected time between stops, estimated time off the vehicle (or waiting for a customer to pick up delivered materials from an AV), unique material ID, material weight, total material weight in the container that is adjusted as each package/material is delivered, the power rate in W/hr given the per-stop weight of the vehicle (including any driver, the container, and remaining materials/packages) between stops, the watts used to get from a given stop to the next stop, power remaining in the container battery system in amp hours, and the state of charge as a percentage of power remaining in the battery system as of each stop, to complete the delivery route.

Referring to FIG. 8, there are shown various stops, for either package drop-off or pickup, which begin and end at a last-mile transfer station LMTS 805. The map of FIG. 8 is an example representation of a typical last-mile delivery route, and depending on where and when the route is located, such factors as geography, terrain, and possibly typical weather considerations (not shown) may be considered in calculating an optimal battery charge. Referring further to FIGS. 9A and B, there are assumed in calculations of remaining amp hours various factors such as vehicle weight, motor rating, battery power rating, prevailing temperatures, prevailing winds, etc., as further described below. Referring more specifically to FIGS. 8 and 9A and B, an 11-amp/hour capacity battery at 36 Volts (nominal fully-charged) in an e-cargo bike weighing 67 kg and an average driver weight of 80 kg with cargo weight of 74.9 kg are assumed (which equals a total mass of 221.9 kg), whereas using standard calculations the total battery power available=the capacity X voltage=396 watts of available power. Consuming watts/hour, if the system operates for a given number of minutes, the amount of power consumed may be determined in accordance with the above-described factors, such as distance between stops, slope between stops, etc., all as summarized in these figures.

FIGS. 9A and 9B represent power consumption data for delivery of materials in a delivery manifest for a smart container 202, 402, 602 loaded to only 74.9 kg, whereas the FIGS. 10A and 10B represent similar data elements but with remarkably different power consumption data for delivery of materials in a delivery manifest for a smart container 202, 402, 602 loaded with the much greater load of 350 kg of materials (the recommended maximum load for last-mile delivery vehicle containers), or greater cargo load weights for AVs. As may be seen, the power consumption for the much heavier load represented in FIGS. 10A and 10B is significantly greater, such that the battery system 550 is put at risk in this scenario since it is discharged down to only 5% remaining state of charge (whereas the industry recommended minimum state of charge is more like 20%, and in fact a typical protection circuit may likely have disconnected—turned off—the battery at the 20% threshold). Thus, it may be seen that the presently claimed container with battery system associates power requirements with specific container loading information to allow materials delivery companies and delivery contractors to efficiently right-size delivery loads and onboard container battery power requirements appropriate battery capacity and degree of charge.

FIGS. 11A and 11B together comprise an outline of a last-mile delivery logistics system in the form of an entity relationship diagram useful for a developer of computer, database, materials providers, and last-mile delivery systems developers for operating, managing, and controlling the system and logistics of the present disclosure, wherein there are shown the interrelationship of a plurality of designated databases, comprising manifests 1101, materials 1102, vehicles 1103, senders 1104, recipients 1105, stations 1106, battery systems 1107, containers 1108, drive systems 1109, route plans 1110, drivers 1111, and route segments 1112 databases, and wherein matching letters A-H are used to show continuation of relationship lines from FIG. 11A as they continue onto to FIG. 11B.

As shown in FIGS. 11A and 11B, a typical manifests database 1101 comprises such elements as manifest IDs, container IDs, vehicle IDs, driver IDs, station IDs, delivery dates, total item counts per container, and total cargo weights per container. Further, a typical materials database 1102 comprises material IDs, manifest IDs, recipient IDs, sender IDs, material weights, material sizes, material descriptions, material delivery instructions, delivery status, and delivery dates/times. These first two databases are related, for example, as shown through the manifest ID foreign key of the materials database pointing to the manifest ID primary key in the manifests database as known by those skilled in the art of database programming.

Further, a typical vehicles database 1103 comprises vehicle IDs, battery system IDs, drive system IDs, vehicle types, and vehicle weights. Still further, a typical battery systems database 1107 comprises power system IDs, nominal voltages, amp hours, watt hours, and charge level percentage (SOC) information. Yet further, a typical drive systems database 1109 comprises drive system IDs, vehicle motor models, and motor efficiencies in Wh/mi. Of course, in the case of AV delivery vehicles, drivers are not needed, and therefore inclusion of a driver in a particular scenario may be optional depending on the type of vehicle involved, but where a driver is specified, as for e-cargo bike delivery vehicles, a typical drivers database 1111 comprises driver IDs, driver names, driver weights, and driver efficiency ratings. Further, it will be appreciated that different delivery scenarios may involve different factors in choosing the best delivery vehicle for the job. Thus, for example, efficiency in battery power consumption by a particular motor type or delivery vehicle may not be the highest priority, but rather current location of the vehicle, higher motor power (i.e., torque), vehicle speed, etc., may be more important for a case where, for example, a high-priority or emergency delivery.

A typical containers database 1108 comprises container IDs, battery system IDs, container weights (empty), and container volumes. A typical route plans database 1110 comprises route plan IDs, manifest IDs, and container IDs. A typical route segments database 1112 comprises route segment IDs, route plan IDs, material IDs, recipient IDs, step number distances traveled, topology adjustments, and ambient temperatures.

A typical senders database 1104 comprises sender IDs, company names, contact names, and addresses, phone numbers, and email information. A typical recipients database 1105 comprises recipient IDs, company names, contact names, and addresses, phone numbers, and email information. A typical stations database 1106 comprises station IDs and their address information where containers may be picked up and dropped off at various stations.

The foregoing databases are interrelated by exemplary entity relationship lines A-H as shown and known to those skilled in the art of database programming. It will be appreciated that other possible entity relationships may be used without limiting effect on the claims hereof. Thus, for example, line E of FIG. 11A relates a driver ID foreign key (FK) in the manifests database 1101 to a particular driver primary key (PK) in a drivers database 1111 in FIG. 11B. In common database entity relationship diagram parlance, for example, a dot means one (e.g., one manifest ID in the manifests database 1101) is associated with many (signified by a diamond or forked line) possible elements (e.g., one of many manifests in the materials database 1102).

A preferred system may entail last-mile deliveries starting when a shipper provides a preloaded container and a shipping manifest to a station (i.e., a TULIPS station per PCT Patent Application Ser. No. PCT/US21/39641) servicing the last-mile route where deliveries are to be made. Data related to the container 202, 402, 602, its contents (materials to be delivered) 590, and a plan are encapsulated in a database system 1100 (as shown in the ERD). Each container 202, 402, 602, as previously described, is identified with an associated unique Container ID.

While a container 202, 402, 602, identified by its Container ID will be reused, the content of the container for a specific date and delivery route are specified in the manifests database 1101. A manifest ID identifies a specific manifest in the manifests database 1101 and associates it with a designated container 202, 402, 602 for a delivery on a specified date.

Thus, the manifest for a specific delivery can be found in the manifests database, wherein individual manifests provide delivery information for each delivery preloaded into a container with a container ID destined for a vehicle making deliveries with a vehicle ID by an individual driving the vehicle (if required) with a specific driver ID. An originating station having a station ID is specified in the station database 1106 where the delivery will be dispatched from on a given delivery date. The total number of items in the delivery are represented by a total item count, and the total weight of all items combined, are both found in the manifests database 1101.

Each manifest preferably identifies a specific vehicle 201, 401 designated by a shipper or a last-mile delivery provider. The specified vehicle 201, 401 is found in the vehicles database 1103 identified by a unique vehicle ID.

The route plans database 1110 is essentially a linking database which associates specific manifests (manifest ID) with particular containers (container ID) and a group of delivery segments (pointed to by a route plan ID), wherein the container is loaded with the cargo for the particular route plan so that the delivery process may be efficiently completed as per typical relational database art.

Battery Charging Considerations

Selection of a vehicle 201, 401, container 202, 402, 602, and (optional) driver will yield a predicted efficiency of the entire system working together, producing an estimated efficiency measured in watt hours per hour (W/hr). This estimated efficiency may be used to calculate a total battery charge cost needed to complete the delivery route. In turn, this information may optionally be used to reduce the amount of time of charging of batteries, if it is known that a sufficient charge may be imparted for a particular delivery load.

Such efficiency information (W/hr) may be used in connection with the manifests database 1101 to form appropriate route plans and associated step-by-step delivery instructions needed to complete last-mile deliveries of materials for a particular container 202, 402, 602 and stored in the last-mile delivery database system 1100 for access via the route plans database 1110.

When charging the container, charge levels will be used that provide adequate power for the delivery, including some margin for unanticipated loads, without requiring excessive charge prior to delivery and over utilization of the battery during the delivery process.

Good measurements of gravity, rolling resistance, and aerodynamics are rare. Using predicted metrics for each delivery and measurement of actual results, the system of the present disclosure may improve accuracy of predicted metrics by tracking actual data and applying a heuristic measurement and adjustment system capable of comparing predicted results to actual results and reinforcing metrics when results are accurate, while undermining metrics when metrics miss the mark.

Accordingly, FIG. 12 is a flowchart showing the analysis of route plan predicted data being compared to actual route metrics to check accuracy of a given route plan, using accuracy measurements in a heuristic operation to reinforce more accurate predicted data items and to undermine less accurate predicted data items, to enable improved overall accuracy of the system in predicting power consumption for a particular route. Thus, as shown, an inbound route plan from a shipper is shown as received at 1201 consisting of multiple route data items. Each route data item 1202 is saved by the system as a candidate for a route delivery plan as shown at 1203. The candidate data item is merged by the system with known data stored in the heuristic knowledge base for delivery plans 1204 about that particular route data item. Thus, for example a known address may be merged with known elevation data. The merged data is then put together in the same record and checked to verify whether the data item is current and complete at 1205. If not current and complete, it us updated at 1206 and re-presented at 1202. If it is current and complete it is tested at 1207 to see if it is heuristically viable (i.e., is the suggested data value consistent with known data). If not, the data is qualified at 1208 and passed back into the system at 1206 and 1202. If the data is heuristically viable, it is released to a container based on a heuristic best guess at 1209. The released data is included by the system in an outbound route plan which is returned to the shipper at 1210 and also used as delivery instructions for a driver (or an AV) at 1211 wherein the delivery vehicle makes deliveries according to the route plan and collects actual results which may differ from the original route plan. The actual results are analyzed compared to the route plan at 1212 and submitted at decision diamond 1213. If the results are as predicted (i.e., they are accurate), then the data item's heuristic metrics are reinforced at 1214 in the system's database. If the results are not as predicted (i.e., they are inaccurate), then the data item's heuristic metrics are undermined at 1215. These reinforcements and undermining records are stored in the heuristic knowledgebase for delivery plans 1204.

Referring now to FIGS. 13A-C, there are shown various charging stations in accordance one or more aspects and embodiments of the disclosure. In FIG. 13A, a container 1302 having a battery system 550 is shown being charged via its power cord 555 and connector 560 with a charging station 1395 having a control system 1397. The connector 560 plugs into an interface (such as a socket 1399) of the charging station 1395. It will be appreciated by those of ordinary skill in the art that the charging station 1395 may have its own cord and connector serving as a power delivery cable and interface. In this embodiment, the control system 1397 communicates with a container control system 570 to facilitate charging the battery system 550 to at least a minimum sufficient charge to complete a given anticipated delivery of a specific container load for a specific anticipated delivery route. Such determination may be made as per a delivery manifest in the container control system 570, and the charging station control system 1397 facilitates charging of the container's battery system according to such determination.

The charging station 1395 may be located, for example, out in the field, such as in a parking lot, at a mass transit station, or even in a mass transit vehicle. In this embodiment, the charging station 1395 is adapted to charge the battery system 550 while it resides in the container 1302. The charging system 1395 may also be equipped with an antenna 160 to facilitate communication with a server to allow for payment of charge imparted.

In FIG. 13B, there is shown an embodiment of a charging station 1350 adapted for charging a plurality of battery systems 550 interconnected to each other and with the charging system via connectors 554. The charging system 1350 comprises one or more control systems 1360 for facilitating charging the battery systems 550 within battery optimal charging and utilization parameters. The connectors 554, whether of the battery systems 550, or of the charging station 1350, comprise an interface for connecting the battery systems to the charging station. In this embodiment, it is anticipated that the charging system control systems 1360 would primarily operate to control charging to a maximum recommended charge depending upon the type of battery system 550 encountered.

In FIG. 13C, there is shown an alternative embodiment charging station 1388 that provides for inductive charging of a battery system 550 via a sending inductor 1386 which imparts a charge to a receiving inductor 1385 on a container 1304. In this embodiment there is preferably provided a control system 1389 of the charging station 1388, and the charging station may be integrated into another machine, such as a mass transit vehicle, or a surface of a charging area or building, in order to communicate with a container control system 570 to facilitate charging the battery system 550 to at least a minimum sufficient charge to complete a given anticipated delivery of a specific container load for a specific anticipated delivery route. Such determination may be made as per a delivery manifest in the container control system 570, and the charging station control system 1389 facilitates charging of the container's battery system according to such determination.

As with previously described containers 202, and 402, the container 1302 (FIG. 13A) and 1304 (FIG. 13C) also preferably may be provided with an antenna 1362 connected to the container control system 570 as known to enable the types of communications described previously and to further facilitate charging to coordinate and plan for deliveries, additional power needs, and any auxiliary power needs. Thus, persons could query a server in real time as to whether there are containers available with sufficient charge in an area to put out an ad (or other notice) in the area and then to wirelessly send display information (contents, font, text size) to the container control system for display on the container.

While a preferred embodiment of the present invention has been shown and described, it will be appreciated that one of ordinary skill in the art will recognize the inventive principles disclosed are not limited to the embodiments disclosed herein, and that various aspects of the invention may be modified without departing from the true spirit of the invention as claimed. Thus, by way of example, it will be appreciated that this invention provides.

What is claimed is:

1. A combined container and battery system adapted for delivery of container contents when being carried by a battery-powered e-cargo cycle delivery vehicle that is for local delivery purposes, such as for last-mile package deliveries, the delivery vehicle otherwise being separate from the combined container and battery system, the combined container and battery system comprising:

A container adapted for containing contents comprised of materials to be delivered to one or more locations;

A battery system in said container;

A connector adapted for interconnecting said battery system with the e-cargo cycle delivery vehicle during placement of said container on the e-cargo cycle delivery vehicle in the field for delivery of the contents to the one or more locations, said battery system thus being adapted for providing power via said connector to the e-cargo cycle delivery vehicle while said container is on the e-cargo cycle delivery vehicle to thus carry said container to the one or more locations and to thus help accomplish delivery of the contents of said container; and A control system for said container adapted for receiving materials information and delivery information, said control system facilitating any one of e-cargo cycle delivery vehicle choice, battery charging, and delivery status communication, wherein said control system is adapted to receive information pertaining to materials to be delivered within said container for a shipment along a specific delivery route and determines a minimum charge level needed considering factors comprising any of chosen vehicle weight and efficiency, battery system capacity, materials information, materials weight, number of stops, distance between each stop, route topology, driver weight, and driver efficiency.

2. The combined container and battery system of claim 1, wherein said container control system is also preferably adapted to communicate an appropriate level of charge needed for the particular shipment in the container for the specific route.

3. The combined container and battery system of claim 2, wherein said container control system is adapted to receive and communicate recipient information and recipient address to an e-cargo cycle delivery vehicle control system.

4. The combined container and battery system of claim 1, wherein said battery system is adapted for providing additional power to accomplish at least one of a plurality of auxiliary tasks comprising: to electronically display branding information, to electronically display third-party advertising information, to power rented equipment delivered by the vehicle to a customer, and to provide mobile power to consumers.

5. The combined container and battery system of claim 1, wherein the battery system is interchangeable with any of a plurality of containers adapted for containing contents comprised of materials to be delivered to one or more locations via any of a plurality of e-cargo cycle delivery vehicles.

6. A combined container and battery system adapted for delivery of container contents when being carried by a battery-powered human-operated cargo cycle delivery vehicle that is for local delivery purposes, such as for last-mile package deliveries, the cargo cycle delivery vehicle otherwise being separate from the combined container and battery system, the combined container and battery system comprising:

A container adapted for containing contents comprised of materials to be delivered to one or more locations;

A battery system in said container; and

A connector adapted for interconnecting said battery system with the cargo cycle delivery vehicle during placement of said container on the cargo cycle delivery vehicle in the field for delivery of the contents to the one or more locations, said battery system thus being adapted for providing power via connector to the cargo cycle delivery vehicle while said container is on the cargo cycle delivery vehicle to thus carry said container to the one or more locations and to thus help accomplish delivery of the contents of said container, wherein the degree of charge to be imparted to said battery system is dependent upon parameters associated with the cargo cycle delivery vehicle container delivery.

7. The combined container and battery system of claim 6, wherein the parameters comprise any of cargo cycle, driver, and loaded container weight; cargo cycle efficiency; anticipated route length, topology, and number of stops; ambient temperature; battery chemistry, battery system capacity, battery system safe charge and discharge levels, existing battery system charge level; and anticipated auxiliary tasks.

8. A combined container and battery system adapted for delivery of container contents when being carried by a battery-powered autonomous vehicle (AV) that is for local delivery purposes, such as for package deliveries on busy city roadways and sidewalks, the AV otherwise being separate from the combined container and battery system, the combined container and battery system comprising:

A container adapted for containing contents comprised of materials to be delivered to one or more locations;

A battery system in said container; and

A connector adapted for interconnecting said battery system with the AV during placement of said container on the AV in the field for delivery of the contents to the one or more locations, said battery system thus being adapted for providing power via said connector to the AV while said container is on the AV to thus carry said container to the one or more locations and to thus help accomplish delivery of the contents of said container, wherein the degree of charge to be imparted to said battery system is dependent upon parameters associated with AV delivery of said container.

9. The combined container and battery system of claim 8, wherein the parameters comprise any of the AV and loaded container weight; AV efficiency; anticipated route length, topology, number of stops; ambient temperature; battery chemistry, battery system capacity, battery system safe charge and discharge levels, existing battery system charge level; needed container access control power; and anticipated auxiliary tasks.

10. A local delivery vehicle adapted for accommodating a combined container and battery system, comprising a container for carrying contents for delivery and a battery system with a connector for powering the delivery vehicle, adapted to accomplish delivery of the contents of the container when it is on the delivery vehicle, the delivery vehicle comprising:

A delivery vehicle comprising a human-operated battery-powered e-cargo cycle;

A physical interconnection on said delivery vehicle for retaining and carrying the container on said delivery vehicle; and An electrical interconnection on said delivery vehicle for interconnecting with the connector of the battery system when the container is being carried on said delivery vehicle, said delivery vehicle thus being adapted for receiving power from the battery system of the combined container and battery system via the connector to assist said delivery vehicle to deliver contents of the container while it is on said delivery vehicle, wherein said delivery vehicle comprises a computer in the delivery vehicle and the container comprises a computer in the container, and wherein the computers are adapted for communicating information relating to delivery and delivery status, wherein said vehicle is capable of being powered primarily by the battery system of the combined container and battery system while the container is carried on the delivery vehicle, wherein said computer in said delivery vehicle provides a communications interface for displaying sequential delivery instructions and navigation to the operator of the e-cargo cycle and for communicating status of delivery information to the computer in the container.

11. The delivery vehicle of claim 10, wherein said computer in said delivery vehicle is adapted for receiving communication of delivery information from the computer in the container, comprising: delivery route, materials count, ID, weight, delivery address, delivery instructions, delivery priority, and delivery status.

12. The delivery vehicle of claim 10, wherein said computer in said delivery cycle is adapted for communicating delivery status information to the computer in the container.

13. A battery system charging system adapted for facilitating charging of a combined container and battery system for powering a local delivery vehicle when the combined container and battery system is on the delivery vehicle, for facilitating delivery of the container's contents, the battery system charging system comprising:

A control system; and

A charging interface, wherein the control system facilitates charging of the combined container and battery system up to a full charge via the charging interface, wherein said control system communicates with a computer in the container to determine the power necessary for the battery system within battery system optimal charging and utilization parameters to complete a given anticipated delivery of a specific container load for a specific anticipated delivery route, as per a delivery manifest, and facilitates charging of the container battery system according to the determination.

14. The charging system of claim 13, wherein said control system provides adequate power in accordance with a power budget needed for the given anticipated delivery route per the manifest and the computer in the container.

* * * * *